US 7,050,501 B2

(12) United States Patent
Alvarez

(10) Patent No.: US 7,050,501 B2
(45) Date of Patent: May 23, 2006

(54) DIGITAL NOISE REDUCTION TECHNIQUES

(75) Inventor: José Roberto Alvarez, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 689 days.

(21) Appl. No.: 10/196,477

(22) Filed: Jul. 16, 2002

(65) Prior Publication Data

US 2004/0012720 A1    Jan. 22, 2004

(51) Int. Cl.
*H04N 7/12* (2006.01)
*H04N 5/14* (2006.01)
*H04N 9/64* (2006.01)

(52) U.S. Cl. .................................. 375/240.16; 348/701

(58) Field of Classification Search ................ 348/701, 348/402.1, 407.1, 416.1, 607, 620; 375/240.16, 375/240.26

See application file for complete search history.

(56) References Cited

U.S. PATENT DOCUMENTS

| 4,682,230 A | * | 7/1987 | Perlman et al. ............. 348/616 |
| 5,268,760 A | | 12/1993 | Suyama |
| 5,446,501 A | * | 8/1995 | Takemoto et al. .......... 348/620 |
| 6,061,100 A | * | 5/2000 | Ward et al. ................. 348/607 |
| 6,359,658 B1 | * | 3/2002 | He et al. .................... 348/607 |

FOREIGN PATENT DOCUMENTS

| DE | 44 09 283 A1 | 9/1995 |
| DE | 196 36 867 C1 | 1/1998 |
| WO | WO 01/61993 A1 | 8/2001 |

OTHER PUBLICATIONS

N. R. Harvey et al., *Application of Non-linear Image Processing : Digital Video Archive Restoration*, IEEE (1997) 731-734, University of Strathclyde, Scotland.

Si Jun Huang, *Adaptive Noise Reduction And Image Sharpening For Digital Video Compression*, IEEE (1997) 3142-3147, Scientific-Atlanta Inc., USA.

* cited by examiner

Primary Examiner—Nhon Diep
(74) Attorney, Agent, or Firm—McAndrews, Held & Malloy, Ltd.

(57) ABSTRACT

A preprocessor system (10) reduces random noise in video pixels by providing a memory (19) arranged to store first pixels processed during a first time period. A motion detector (300) responds to differences between the first pixels and second pixels processed during a second time period after the first time period to generate corrected motion signals. A first filter (100) generates first filtered values in response to the differences and the corrected motion signals. An impulse detector (244) generates control signals in response to detection of impulses, and an impulse reducer (250) generates second filtered pixel values in response to the first filtered values and the control signals.

62 Claims, 15 Drawing Sheets

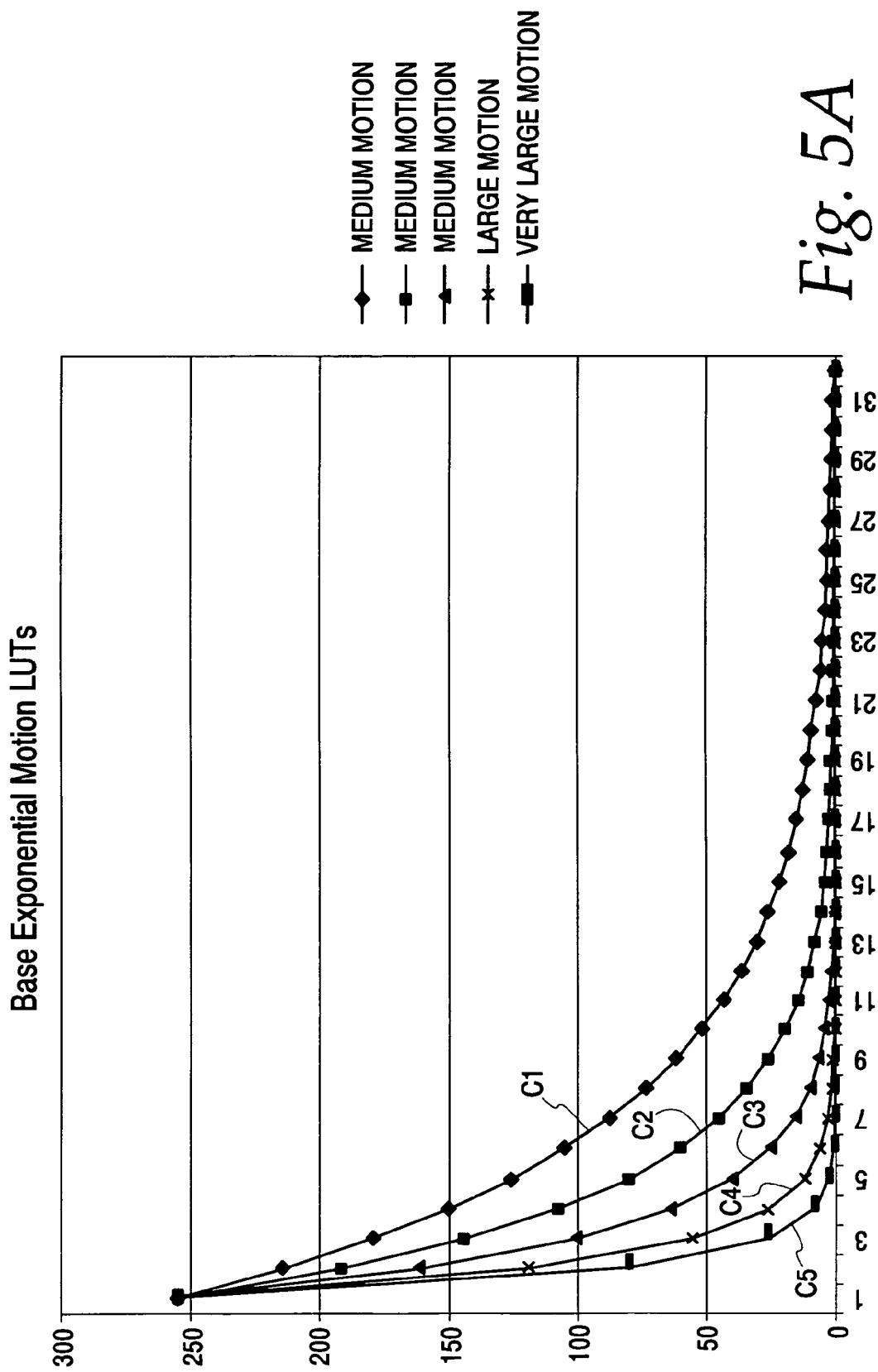

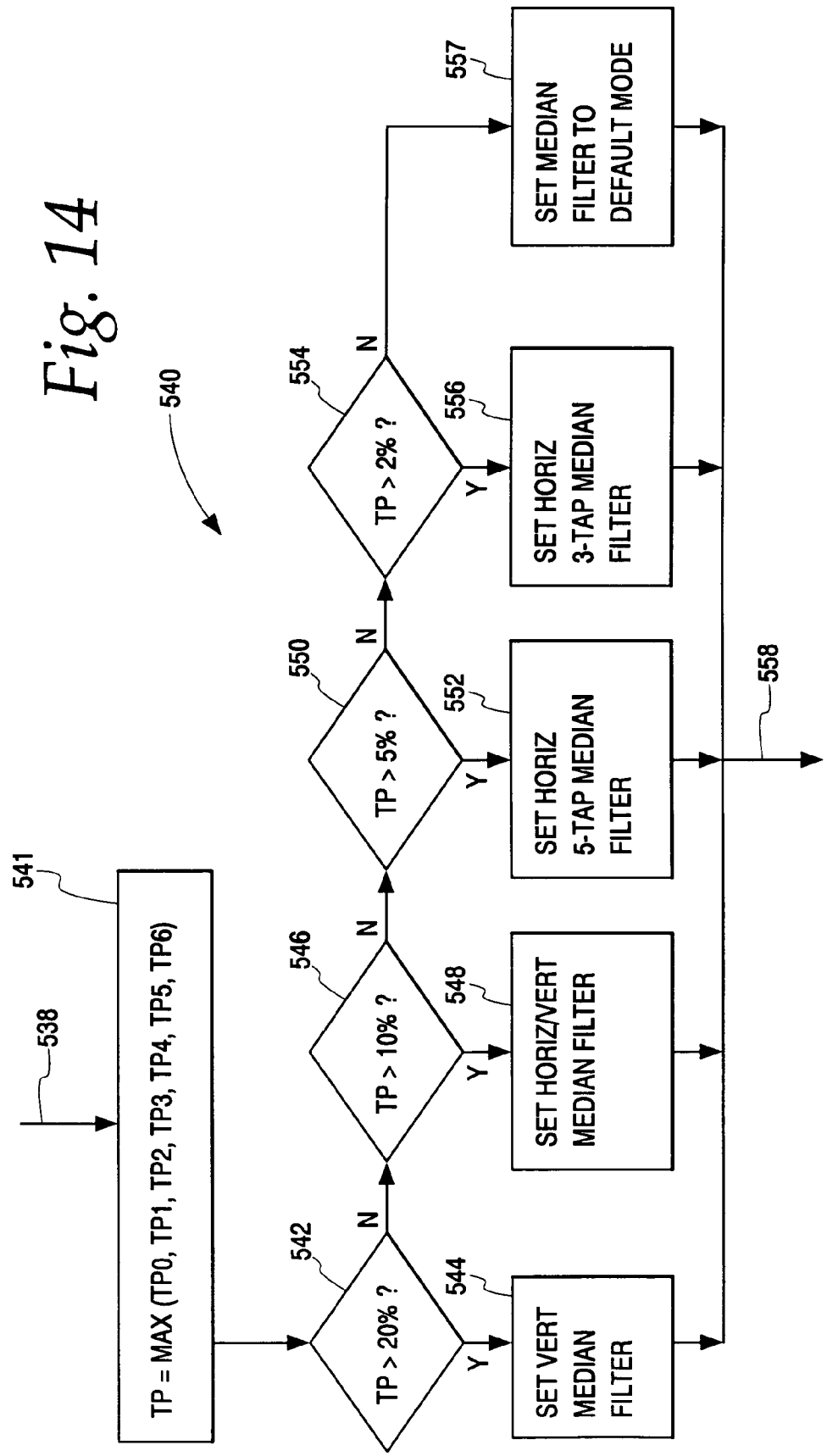

DIGITAL NOISE REDUCTION TECHNIQUES

BACKGROUND OF THE INVENTION

This invention relates to reduction of noise in video pixels and more particularly relates to reduction of such noise before compression.

One application of this invention is digitally removing noise from video sequences that have been digitized from the analog domain in order to increase the efficiency of a digital video compression system. A digital compression system in general takes advantage of redundant information in a video sequence in order to reduce the amount of data needed to represent the video sequence. The removal of this redundant information and subsequent coding of the video sequence produces a compressed bit stream that represents the original video sequence. The quality of the decompressed bit stream back into a video sequence depends on the ratio between the original amount of video data and the compressed bit stream data, and the efficiency with which the compression system is able to encode the information. For example, for a given sequence, the higher the compression ratio the smaller the bit stream produced. As the compression ratio increases, there is a point in which non-redundant information is degraded or lost to the compression process, therefore producing objectionable image artifacts.

In image/video compression systems, fine image details require relatively more bits to code than coarse image details, and therefore produce larger bit streams. For example, images of buildings with intricate wall details would require more bits than the clear blue sky with no clouds behind them. This fine image detail is represented as high frequency two-dimensional information; while the coarse image detail is represented as low frequency two-dimensional information that may include DC frequency, i.e. zero frequency. For purposes of this specification, it is assumed that the high-frequency detail is non-redundant and therefore necessary for a faithful rendition of the original video sequence.

Some high-frequency information is not related to actual image detail but to random noise in the original input sequence. Noise can be introduced in the video sequence in both analog and digital domains. In the analog domain, noise can be created by recording and playback of the video sequence from video tape, by errors introduced in transmission, by interference created by external sources during transmission, and other similar causes. In the digital domain, random noise can be generated by the analog-to-digital conversion process, thermal noise in components, electronic interference, etc. The two main types of noise discussed in this specification can generally be described as random. Two examples of such random noise are: random-white-gaussian-distributed noise; and random-impulsive noise. These types of noise are referred to by different names in the industry, including, 'snow', 'gaussian noise', 'tape noise' for the first type above; and 'impulsive noise', 'salt and pepper noise', 'speckle noise' for the second type.

The compression system itself has no way of knowing that some high-frequency information is random noise and therefore irrelevant to image content. If this random noise is not removed from the original video sequence, it will be coded (compressed) as part of the bit stream therefore causing degradation in quality because bits that could have been used to represent actual image information are being wasted to represent noise.

Therefore, to increase the efficiency of a digital compression system, it is desirable to reduce the amount of random noise in the original sequence so that all coded bits in the compressed bit stream represent actual picture information.

A very simple way used by prior art to reduce the high-frequency content of video sequences is the application of a low-pass filter (LFP) to an input video sequence. This LPF effectively reduces and even eliminates some high frequencies depending on the low-pass cut-off frequency characteristic. However, actual high-frequency image details are eliminated together with high-frequency noise, therefore producing a 'soft' picture.

Another known way to reduce random noise is to use an adaptive two-dimensional filter that preserves some high-frequency image details, like edges of objects. However, the detection of edges themselves can be affected by the noise along the edges; and depending on the low-frequency cut-off point, the images may still look soft. Furthermore, the edge detection is performed statically without regard to edge motion across time.

Other known temporal filters derive motion information from both luminance and chrominance separately, not taking advantage of the correlation between the two signals. Moreover, when other known systems reduce impulsive speckles, they use the filters in open loop mode without validation and correlation of actual impulsive spikes in the input video. Indiscriminant use of a median operator is likely to produce adverse artifacts, especially in the vertical direction.

Prior art systems have failed to recognize the utility of a median filter operation in the motion detection path which is used to eliminate impulses not in the image domain but in the motion/temporal domain. This operation makes a recursive filter perform better by controlling the value of the coefficient that controls the recursive time constant of the filter itself.

There are known temporal noise reduction systems that use motion estimation techniques instead of motion detection techniques. However, the motion estimation process is complex and does not fully guarantee the elimination of noise, just reduction.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

One apparatus embodiment of the present invention is useful for reducing random noise in video pixels having digital pixel values by processing the pixel values. In such an environment, the apparatus comprises a memory arranged to store filtered pixel first values corresponding to first pixels processed by the apparatus during a first time period. A motion detector responsive to differences between the first values and pixel second values corresponding to second pixels processed by the apparatus during a second time period later than the first time period generates corrected motion signals representing detected motion of images represented by the first pixels relative to motion of images represented by the second pixels. A first filter responsive to the corrected motion signals based on the differences between the first values and second values generates the first filtered values. An impulse detector generates control signals in response detection of impulses represented by the second pixels, and an impulse reducer responsive to the first filtered values and the control signals generates second filtered pixel values.

One method embodiment of the invention is useful for reducing random noise in video pixels having digital pixel values by processing the pixel values. In such an environment, the embodiment comprises storing filtered pixel first values corresponding to first pixels processed during a first time period, and generating corrected motion signals in response to differences between the first values and pixel second values corresponding to second pixels processed during a second time period later than the first time period. The corrected motion signals represent detected motion of images represented by the first pixels relative to motion of images represented by the second pixels. First filtered values are generated in response to the corrected motion signals and the differences between the first values and second values. A step impulse detecting process generates control signals in response detection of step impulses represented by the second pixels, and impulse-reduced pixel values are generated in response to the first filtered values and the control signals.

By using the foregoing type apparatus, noise in video signals can be reduced with a degree of ease and accuracy previously unavailable.

These and other advantages and novel features of the present invention, as well as details of an illustrated embodiment thereof, will be more fully understood from the following description and drawings.

BRIEF DESCRIPTION OF THE DRAWINGS

FIG. 5A is a graph illustrating embodiments of the programmable LUT shown in FIG. 3.

FIG. 14 is a flow diagram illustrating an algorithm used to set the operating mode of the motion adaptive non-linear filter shown in FIG. 1.

DETAILED DESCRIPTION OF THE INVENTION

Figure 1:
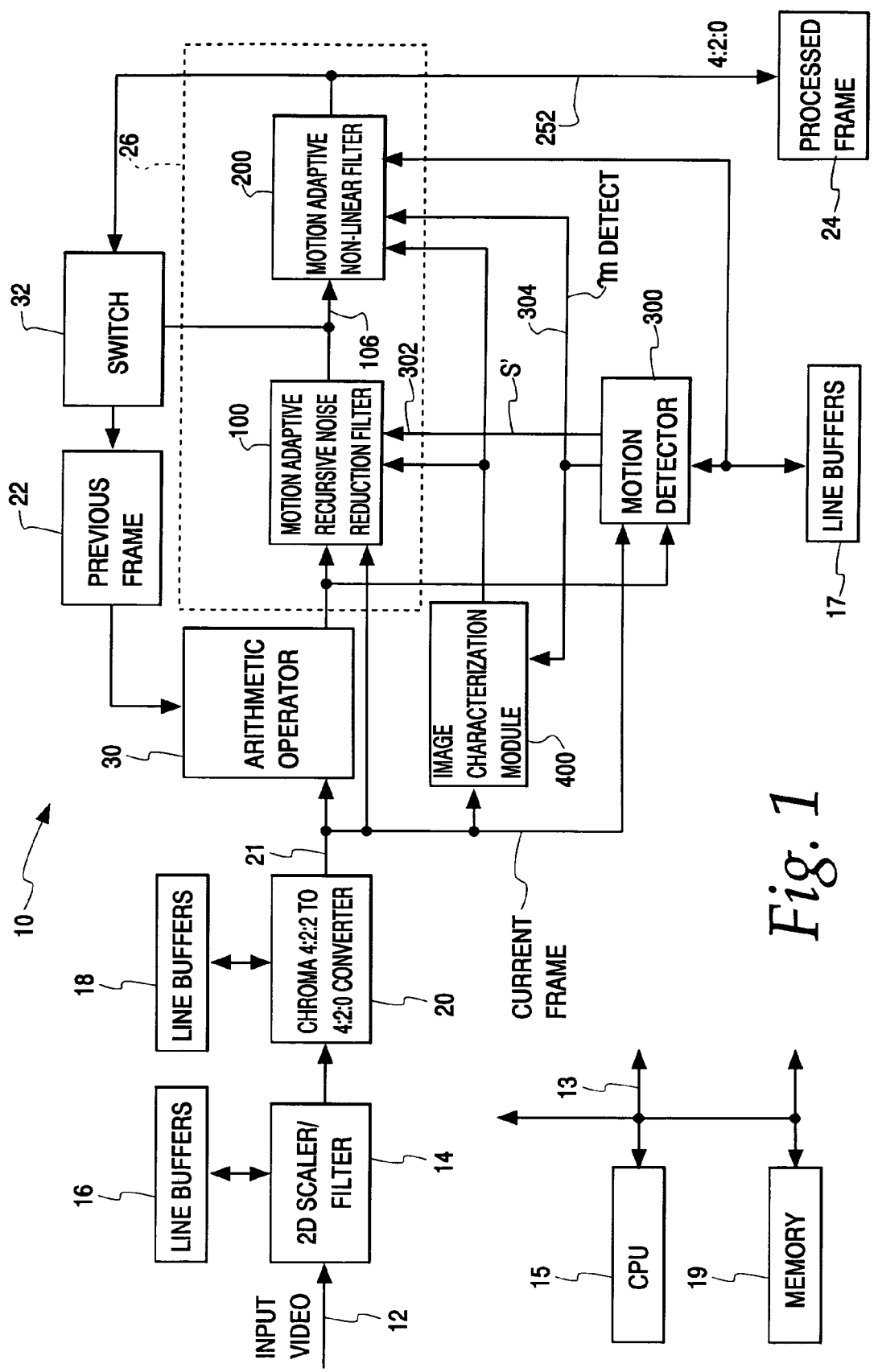
FIG. 1 is a schematic bock diagram of a noise reduction system made in accordance with one embodiment of the invention.

In general, the embodiments shown in the drawings use a combination of spatial and temporal noise reducing mechanisms, including impulse noise reducing mechanisms, to reduce random noise in an input video sequence. The impulse noise reducing mechanisms may employ filtering that is applied dynamically on a pixel-by-pixel basis by programming the behavior of the different processing modules and by controlling the noise reduction process adaptively according to the output of a motion detection module. Other types of impulse reducing also may be employed, such as software that changes the value of a pixel within a plurality of pixels. The change may increase the value of the lowest-valued pixel that is less than a first threshold and/or decrease the value of the highest valued pixel greater than a second threshold. The embodiments include a spatial filter, recursive temporal filter and impulse noise reduction module and the associated modules to control the noise reduction process on a pixel-by-pixel basis.

In general, the motion detection module converts frame-based temporal differences into a facsimile of motion between like-fields of video across video frames. The motion detected from the frame differences is also used to derive temporal characteristics of the video sequence in order to direct the behavior of other functions in the system. Chrominance motion information is derived from luminance motion information and is qualified by a series of dynamic parameters that take advantage of correlation between chrominance and luminance data.

The motion detection module detects edge transitions in the motion signal in order to temporarily change the time constant of the recursive filter in order to further prevent temporal blurring, also known as ghosting (a common artifact byproduct of improperly implemented recursive filters). Furthermore, the embodiments make use of a median operator acting directly on the motion signal in order to detect impulses in the motion signal that may be caused by spurious noise in the input video signal.

The input video sequence is analyzed specifically to detect impulsive noise in order to control the impulsive noise reduction. Furthermore, the input video sequence is also analyzed to detect moving edges in order to control the time constant of the recursive temporal filter structure.

The quality of encoded video can be improved by properly preprocessing a video input signal. One important aspect quality improvement is to remove unwanted or irrelevant picture information, for instance, random noise. Video material in the real world contains various kinds of noise that can be characterized in several ways as gaussian white noise, impulsive noise, interference noise, signal noise, and others.

The embodiments shown in the drawings rely on an adaptive noise-reduction process. In the present context, an adaptive process is one which is able to change according to the nature of the image content on a pixel-by-pixel basis. An example of this type of processing is the motion-adaptive decision made for the value of the temporal filter coefficient at each pixel according to the amount of motion detected.

A dynamic process is one which is controlled by firmware according to information gathered over time. The firmware may control the process at various places, such as a video field boundary or a horizontal video line time. An example is the change in the general form of the motion look-up table shown in FIG. 3 according to the amount of total motion detected over a period of time. This period can span several fields. In this particular example and according to one definition, the hardware continues to make motion-adaptive decisions regarding the recursive time constant for each pixel, but the overall shape of the motion transform function is controlled (loaded) dynamically (as needed) by the firmware.

This specification is organized to provide first an overview of certain features needed for preprocessing, and then to provide the architectural details of the features needed for preprocessing, namely, the temporal recursive linear and non-linear filter structures. The other elements of preprocessing (scaling, spatial filtering and YCbCr 4:2:2 to 4:2:0 conversion) are only referenced in connection with FIG. 1.

These blocks shown in the drawings may be implemented by a combination of hardware capabilities and firmware intervention based on hardware assistance.

FIG. 1 describes a preprocessor system 10 that processes input digital video pixels having digital pixel values received on an input 12. This process involves changing picture size, converting to MPEG color space, and noise reduction. The entire process is under the control of a central processing unit 15 that stores data in a memory 19. The CPU 15 is coupled to each of the blocks shown in FIG. 1 through one or more busses 13. To avoid cluttering FIG. 1, the connection of the busses to the various blocks has been omitted from the drawing. This specification describes ways of reducing random noise generated by low quality video signal sources, typically converted from the analog domain.

One way of reducing noise is to perform spatial filtering, such as the spatial filtering performed by a 2D scaler/filter 14. This type of noise reduction can be effective but leads to loss of picture detail since it relies on attenuating high frequencies in which random noise is prevalent. A better way of reducing random noise is to use temporal information in the input sequence and filtering the noise in both spatial and temporal domains using linear and non-linear filter structures.

The top-level architecture of a complete preprocessing module suitable as input stage to an MPEG encoder is depicted in FIG. 1. One goal of this architecture is to achieve noise reduction with relatively simple hardware modules and with the help of firmware decisions performed on a field basis to influence the real-time performance of the hardware.

The input to preprocessor system 10 is digital video which has been converted from the analog domain by an analog video decoder (not shown in FIG. 1). To indicate vertical processing, the line buffer blocks 16–18 represent storage elements that may contain adjacent horizontal video lines necessary to perform vertical filtering. There is always a compromise in using internal buffers regarding silicon area and system bus access. It is convenient to store adjacent video lines in local buffers without having to utilize external memory bandwidth in accessing pixels across horizontal lines. For the purpose of this specification, line buffers are used to indicate storage necessary to perform operations along the vertical picture direction.

In many cases, input video must be scaled down depending on the bit rate required for a final display device. A 2D Scaler/Filter module 20 performs both downscaling and spatial filtering, as well as cropping the input video to specific resolutions and bandwidth requirements. The MPEG Encoder will set the size and spatial filtering required for the appropriate video sequence, instantaneous compression factor, and bit stream produced.

Most digital video sources are presented in the YCbCr 4:2:2 color space domain. Since MPEG-2 requires the video to be presented in the YCbCr 4:2:0 domain, it is advantageous to convert to this color space as early as possible in the processing chain in order to decrease memory storage requirements and speed up computations. Since 4:2:2 to 4:2:0 conversion is a vertical downscale operation with very specific phase requirements, it is presented as a separate processing block 20 in FIG. 1.

A previous frame block or buffer 22 holds picture information derived from a processing stage one frame-time in the past. The data written to block 22 is determined by the condition of a switch 32. Normally, switch 32 is set so that the data written to block 22 is taken out of a motion adaptive recursive noise reduction filter 100. However, according to an alternative embodiment described in connection with FIGS. 9 and 10, the data written to block 22 may be take from processed frame 24. This alternative process is explained in a later section. If desired, more than one previous frame block may be stored.

A processed frame buffer 24 contains the completely processed frame and may be input to an MPEG Encoder module (not shown). Thus, buffer 22 stores a frame of pixels processed by preprocessor 10 at a time period earlier than the time period during which preprocessor 10 processes the current frame of pixels transmitted along a path 21. Line buffers 16–18 and frame buffers 22 and 24 form part of memory 19.

Digital video signals are processed in the way they are captured by the analog digitizer, i.e., in the form of interlaced frames of video. Each frame consists of two fields of $\frac{1}{60}^{th}$ of a second duration. Horizontal and vertical synchronization signals derived from the input video are used to coordinate most of the processing operations described in the present architecture. The embodiments shown in the drawings also are effective for progressive sequences (non-interlaced).

The digital signal processing structures described in this specification make the implicit assumption that chrominance (C) is processed in the same manner as luminance (Y), unless otherwise specified. Each chrominance component (Cb, Cr) is processed individually; therefore, filters keep intermediate results for each component.

Chrominance components (Cb Cr) are assumed to be co-sited (sampled at the same time) as the Luminance (Y) component on even sampling locations 0, 2, 4, etc. This assumption does not always hold true because of the wide variance in analog video decoder implementations. Therefore, it is advisable that video interface module at the input of the Scaler/Filter 14 has the capability of swapping color components, offsetting chroma samples and reversing the Y and CbCr sampling order.

Implicit in the Figures is the insertion of matching processing delay elements. One example is the initial motion detection signal mDetect described in following sections. This signal is used to control the processing at various stages, but must be properly delayed to match the corresponding pixel being processed as the video signal travels through the processing elements.

In some sections of this specification, the term "current frame" indicates the luminance and chrominance signals as they are obtained directly from the digital video input port 12.

It is assumed that all signal gain changes are properly saturated and clipped to values 0 to 255, including cases where there could be arithmetic shifts in the left or right directions. All FIR low-pass filters used in described embodiments have positive coefficients that add up to 1.0 (256) and therefore have unity gain at DC. The high-pass filters used are first order with also no gain at DC. Filter coefficients are assumed to be 8-bit quantities. All intermediate computations should be kept at full accuracy and only rounded at interface outputs.

Preprocessor 10 includes a temporal noise reducer 26 comprising frame-recursive IIR type filter 100 and an impulse reduction module 200. Both filters 100 and module 200 are adaptively controlled by the amount of motion detected between images represented by pixels of consecutive frames by a motion detector 300. An image characterization module 400 is also included as shown in FIG. 1. The main purpose of temporal noise reducer 26 is to provide noise reduction for random non-correlated white gaussian type noise as well as impulsive type noise.

The random noise in this case is the kind that can be generated from tape recordings, low quality broadcast transmissions, and system electronic noise that corrupts picture quality. This noise also can include what is widely known as snow in images sequences.

Impulsive noise is also random, but has a very specific structure which is manifested in high contrast dots and picture strikes along the horizontal line, creating all sorts of random speckles in the sequence. This type of noise is knows as salt-and-pepper or partial line drops.

Both types of random noise have detrimental effects in the compression process. There is no way for the encoder to know if the high frequency content is picture information or noise. Therefore, reducing the random noise in the input video sequence can improve compression quality in many cases. However, the characteristics of the filters are dynamically changed to avoid artifacts, such as motion blur, ghosts, and other non-linearities caused by improper setting of filter coefficients.

Still referring to FIG. 1, the signal flow starts with the YCbCr 4:2:0 input data from the color space converter 20. The input data on path 21 is referred to as the current frame in later sections of this specification. The recursive filter 100 takes both the current and previous frame data and applies filter 100 with a coefficient (time constant) that is proportional to a corrected amount of motion detected between frames represented by a signal S'. The S' corrected motion signal is supplied over a path 302 to filter 100. An initial motion signal mDetect is supplied to module 200 over a path 304. The initial motion signal is also used by module 200 to detect and apply a two-dimensional median filter structure to the temporally filtered data.

The advantage of having the non-linear filter follow the recursive structure is the direct use of the motion detection information to obtain a better detection of the amount and nature of the impulsive noise in the pixel sequence. In other systems where the non-linear filter precedes the recursive structure, the non-linearities of the median operator (especially in the vertical direction) can last for several frames if the time constant of the recursive filter happens to be large. (Notice that a large time constant will be set when there is a lot of noise in the sequence.)

The image characterization module 400 keeps a record of the amount of motion of images in the current frame represented by pixels of the current frame, as well as a record of the data currently being processed. The main purpose of module 400 is to help the firmware decide on the optimal system parameters on a field-by-field basis. However, in other applications, the firmware may exercise control on a horizontal (i.e., line-by-line) basis.

Figure 2:
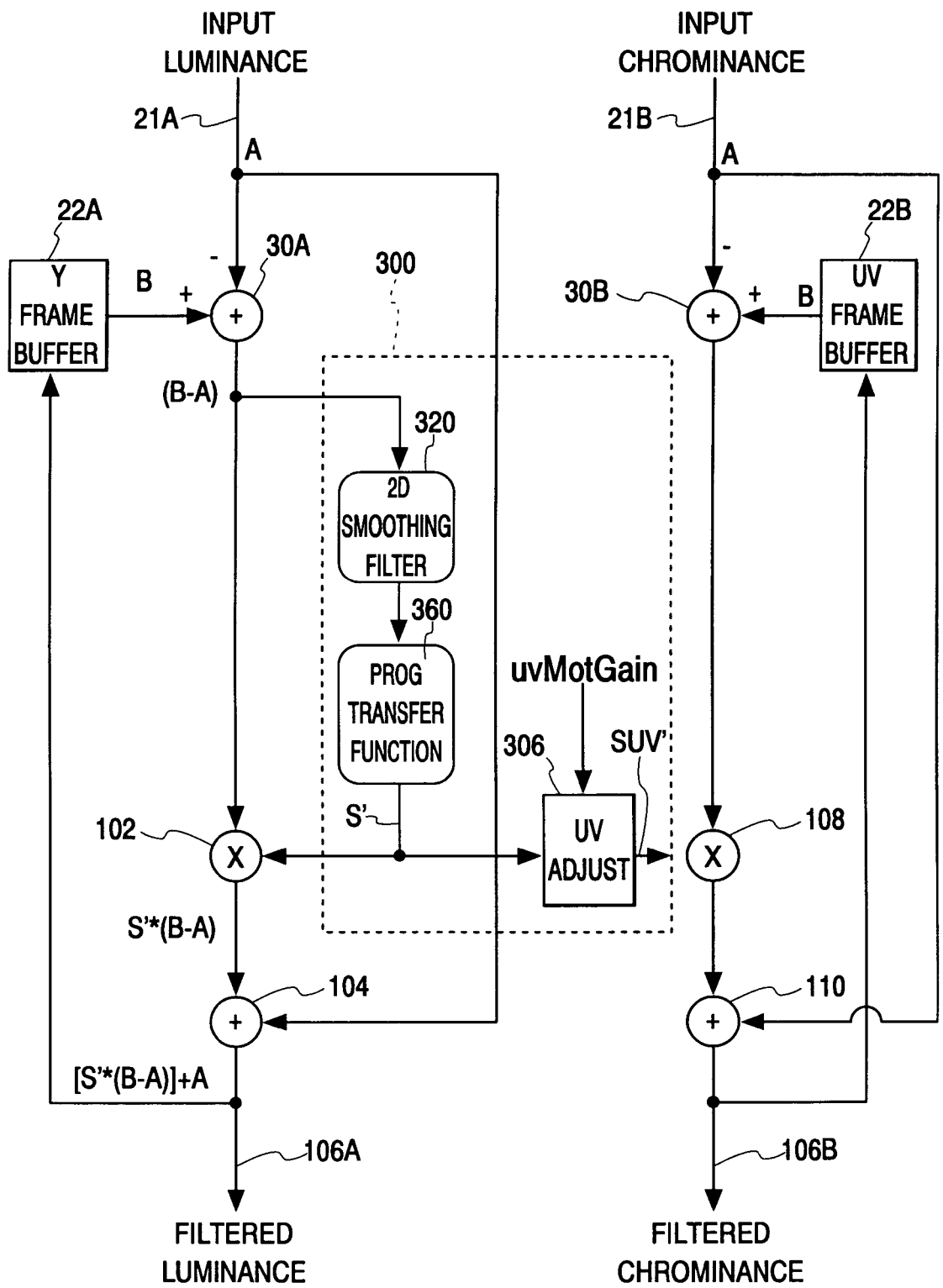
FIG. 2 is a schematic block diagram of the motion adaptive recursive noise reducer shown in FIG. 1.

The recursive filter 100 depicted in FIGS. 1 and 2 works on the principle that random, uncorrelated noise can be filtered in the temporal domain for those regions of the picture where a neighborhood of pixels has remained essentially static for at least one frame-time. Since only one previous frame is stored, the motion detection of detector 300 is limited to a short period of time, but the effects of filter 100 can last much longer due to the recursive nature of filter 100.

Motion detection by motion detector 300 is based on temporal frame differences, which are calculated by an arithmetic operator 30 that subtracts pixels residing in the same spatial locations, but one frame-time apart. Motion detector 300 takes the temporal frame differences and converts them into corrected motion signal S' that represents detected motion. More specifically, motion detector 300 generates corrected motion signals S' representing detected motion of images represented by pixels of the previous frame relative to the motion of images represented by pixels of the current frame.

Motion detector 300 does not estimate motion, it only detects it. For the purposes of the recursive filter 100, it is only necessary to know regions where there is essentially no motion, medium amount of motion and large amount of motion. The precise value of the motion at every pixel is not as important as the neighborhood amount of motion detected.

As indicated in FIG. 2, the motion detection is based on the luminance signal. For the great majority of cases, large area luminance motion will be correlated with the chrominance signal. A UV Adjust module 306 modifies the corrected motion signal S' when the correlation between luminance and chrominance is low.

The arrangement of recursive filter 100 is such that S' indicates a stillness measure, i.e., when the motion detected is low, the value of S' approaches zero. A very high value of S' will increase the recursive effect of filter 100; therefore S' is sometimes referred to as the time constant of filter 100 at the particular pixel being processed. When S' is zero, the value of A (the current frame) will be passed through filter 100 without modification. A value of zero for S' is also used to reset the recursive effect of filter 100 in cases where there has been a large amount of global frame motion.

The adaptive characteristics of recursive filter 100 are controlled by a motion look-up table 362 (FIG. 3) that maps the motion detection signal into the S' signal space. Due to the nature of the recursive noise reduction filter 100, the range of relevant values for the motion detection signal S' is limited. Typically, absolute values greater than 32 are considered very high motion within the small two-dimensional region processed and therefore the look-up table 362 usually consists of at most 32 entries.

Firmware plays a role in the effective use of recursive filter 100. With the help of information gathered by the image characterization module 400, the firmware can change the values of the motion look-up table 362 to better suit the temporal and signal quality nature of the input video pixels. Furthermore, firmware can change the register values that control the gain of S' for both the luminance and chrominance components.

The effectiveness of recursive filter 100 is directly related to the value of S' at each pixel. Modifications to the value of S' can be done in most cases by power-of-two gains. As indicated in the control register section, most gain or attenuation factors are expressed by a few bits.

Reducing noise is a compromise between the effectiveness of filtering and artifacts created due to motion. The control registers described at the end of this specification provide the ability to change the performance of the filter 100 and module 200 under a wide variety of input sources and images sequences.

Figure 3:
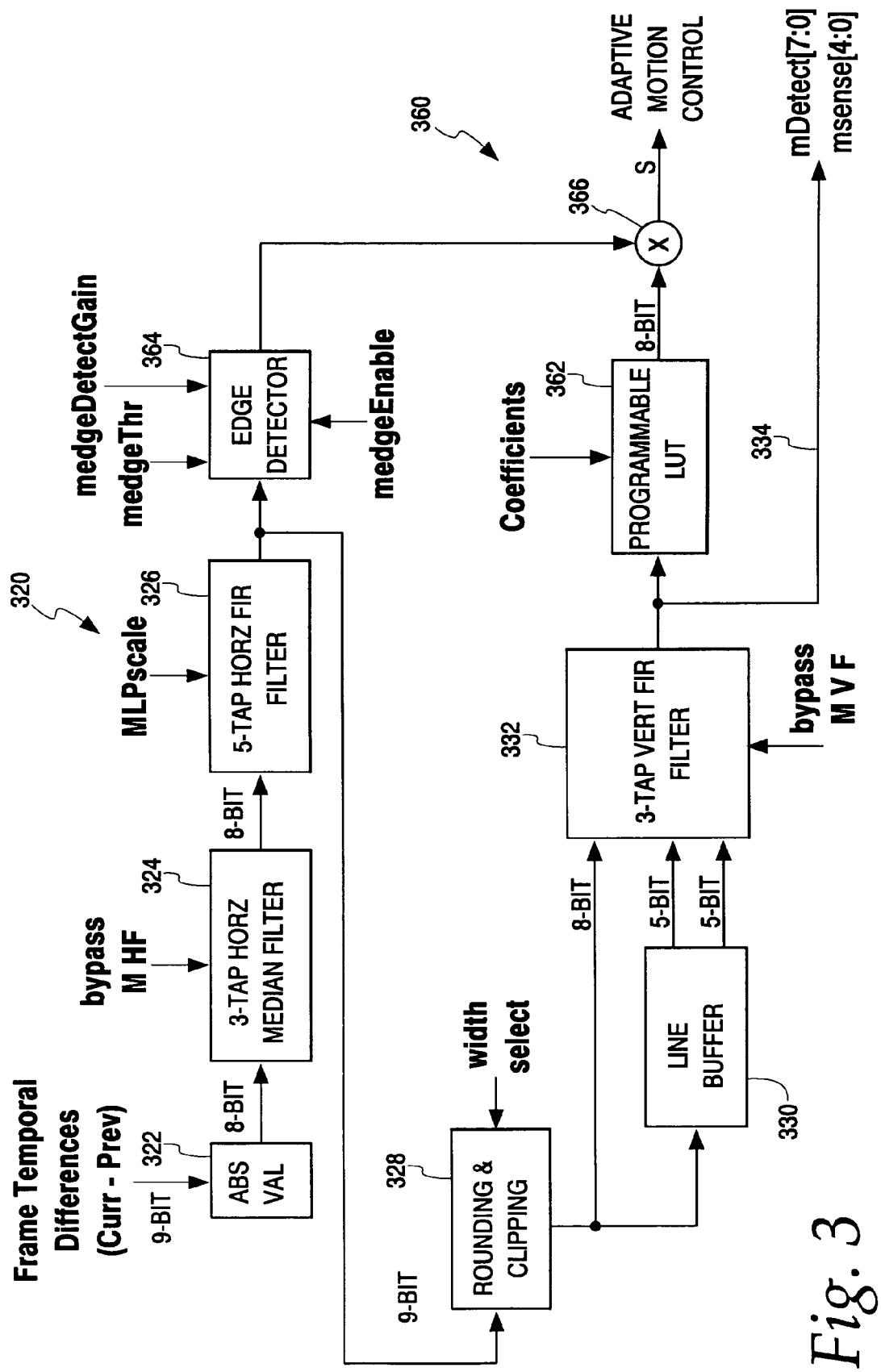
FIGS. 3 and 4 are schematic block diagrams of the motion detector shown in FIG. 1.
Figure 4:
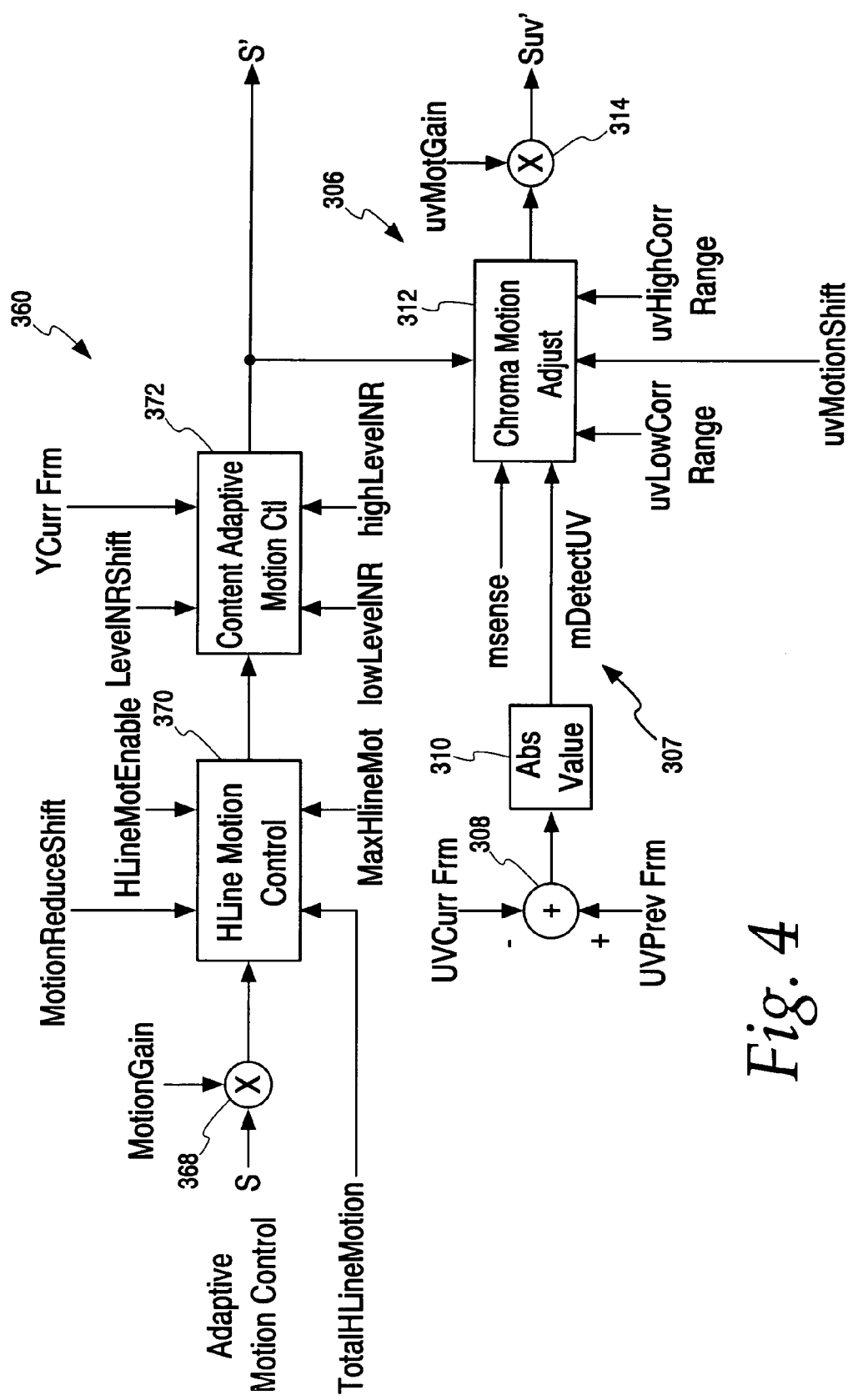

As discussed in a previous section, the corrected motion detection signal S' is based on the temporal difference between frames. FIGS. 3 and 4 depict a block diagram of the motion detector. In FIGS. 3 and 4, the bit widths indicate the relevant signal information used at each stage. For example, although the 3-tap vertical filter 332 (FIG. 3) operates on 8-bit quantities, since the nature of the frame delta signal is such that its frequency distribution is concentrated largely around low values for most image sequences and because the motion detector detects only small, medium and large motion changes, the relevant information is limited to 5-bits and the programmable LUT is accessed by only 32 values in the illustrated embodiment.

Referring to FIG. 2, motion detector 300 includes a two dimensional (2D) smoothing filter 320 and a programmable transfer function module 360. The 2D smoothing filter 320 generates initial motion signals mDetect on a path 334. As shown in FIG. 3, filter 320 includes an absolute value operator 322, a 3-tap horizontal median filter 324, a 5-tap horizontal finite impulse response (FIR) filter 326, a rounding and clipping operator 328, a line buffer 330 and a 3-tap vertical FIR filter 332 interconnected as shown.

The 3-tap median filter 324 is used to eliminate spurious pixel-wide motion between frames. The median filter 324 is a simple ranking operator that always selects the value that is numerically in the center of three consecutive motion samples.

The absolute value of the temporal delta signal is low-pass filtered horizontally by filter 326 to further reduce high frequency components due to noise and to generate horizontal filtered signals. Filter 326 uses fixed coefficients that can be realized without multipliers:

Motion Horizontal Low Pass Filter 326: [1, 3, 8, 3, 1]/16

Still referring to FIG. 3, transfer function module 360 includes an edge detector 364, which provides an indication of a horizontal sudden change in the horizontal filtered signals in order to reduce artifacts produced by horizontal motion of high contrast edges in the images represented by the pixels in the current frame. The resulting effect is the improvement of artifacts caused by the application of a high time constant motion look-up table to video that has only localized motion components when high contrast object or image boundaries move across the current frame. Register medgeThr is used by detector 364 to determine what constitutes a motion edge of an image. For practical purposes, and based on simulation results, the value of medgeDetectGain is either 1.0, ½ or 0.0. The effect of medgeDetectGain is to quickly select the strength of the edge with a one-bit value and is limited to the edge boundaries of images, therefore being very short in duration. The edge signals generated by the output of the edge detector 364 are based on the absolute value of a simple horizontal high pass filter:

Motion Edge Detector 364: abs([1, −1]/2)

Using vertical filter 332 for the frame delta signal further helps the conversion to a neighborhood motion detection signal. The output of filter 332 is saturated to 5-bits when used as msense, the input to the motion look-up table 362. The 8-bit initial motion detect signal, mDetect, is used by other modules as a true motion detection signal. The vertical motion filter 332 is implemented as a simple filter with coefficients:

Motion Vertical Low Pass Filter: [1, 2, 1]/4

In order to reduce area requirements and noting that motion look-up table 362 is limited to 32 values, the compromise of storing the saturated 5-bit motion values can be made. It is clear that this operation will lead to inaccuracies, but many experiments with real video sequences have shown that the final effect in the noise reduction is still much better than simply using the horizontal motion filter 320. This can be explained by the goal, which is to detect motion in a two-dimensional neighborhood of pixels across time; it is not the intention to accurately measure motion since this process is not necessary for successful operation of the simple recursive structure.

The programmable look-up table 362 also is referred to as motion LUT or MLUT in other parts of this specification. The general form of table 362 is a monotonically decreasing function. The function can be either sinusoidal or exponential. Image sequences with large amounts of global motion should use MLUT functions that decay rapidly from the origin. Firmware has the option of changing the complete table at field boundaries or the option of only changing the attenuation factors depending on the nature of the input sequence (derived from information provided by image characterization module 400 and the encoding engine itself).

Figure 5B:
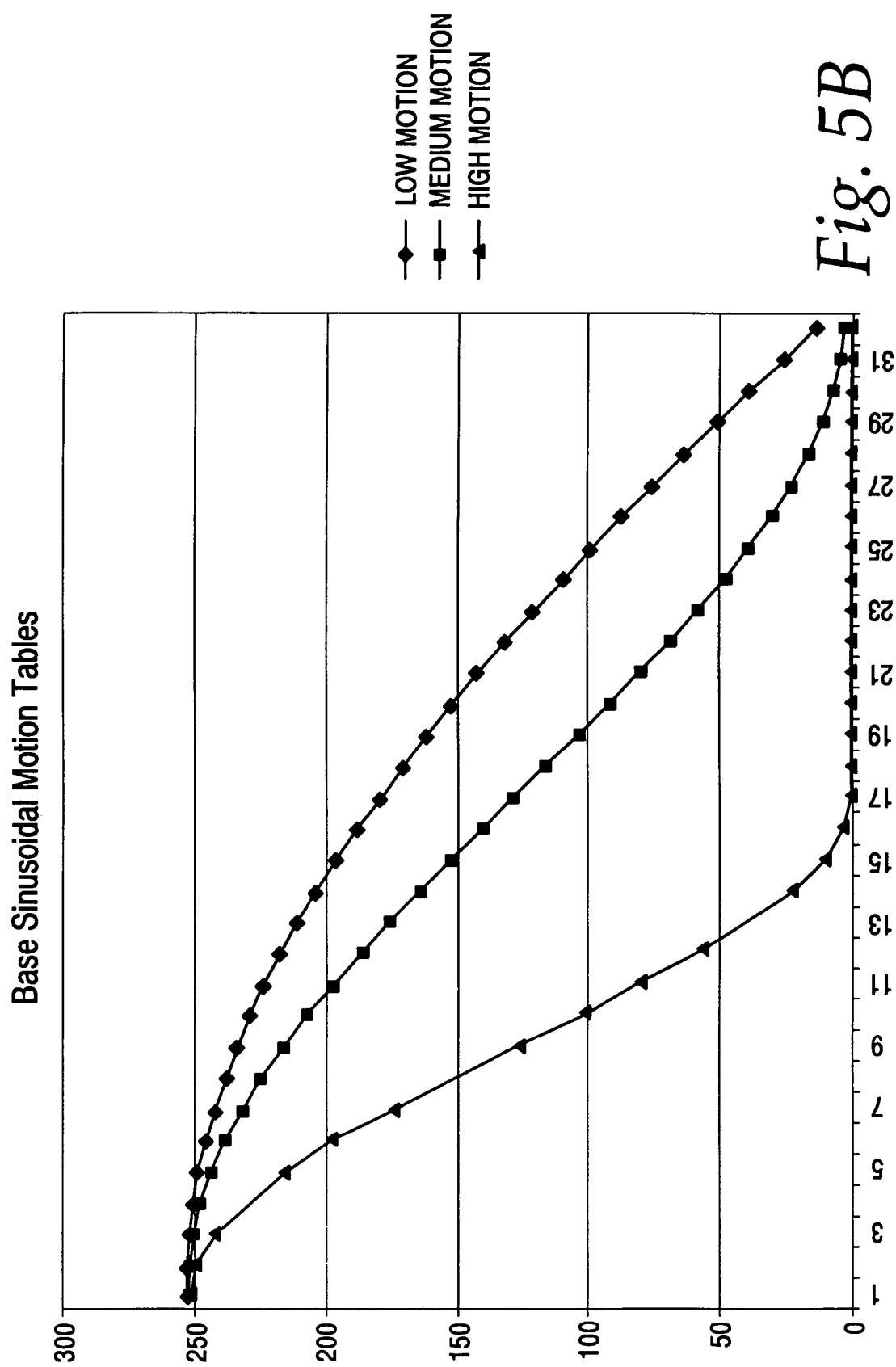
FIG. 5B is a graph illustrating additional embodiments of the programmable LUT shown in FIG. 3.

FIG. 5 shows a family of functions that have been successfully used for various types of input sequences. Notice that a curve with a base shape can be reduced in amplitude by means of the various adaptive gains (attenuators) in the system. The output of MLUT 362 must be in the range [0.255].

The motion look-up tables depicted in FIG. 5 also include sinusoidal versions, as well as the actual data used to generate them. The wider the curve, the more 'aggressive' it is in eliminating random noise. It is important for the curves to 'taper off' gradually as the input values increase to the maximum 32; otherwise motion artifacts can be generated in areas of similar—but not equal—amounts of motion.

Still referring to FIG. 5, curve C1 is the most aggressive and curve C5 is the least aggressive. Curves C1–C5 represent various types of motion of images represented by pixels of the previous frame relative to motion of images represented by pixels of the current frame. More specifically, curves C1–C3 represent types of increasing medium motion, curve C4 represents large motion, and curve C5 represents very large motion.

LUT 362 generates first modified motion signals based on the curves representing the transfer functions. The edge signals from edge detector 364 are multiplied by first modified motion signals generated by LUT 362 in an arithmetic operator 366 to generate second modified motion signals S.

Additional correction of signals S is carried out by components of transfer function module 360 shown in FIG. 4, including a multiple arithmetic operator 368, an Hline motion control module 370 and a content adaptive motion control module 372. The MotionGain input to operator 368 is a fixed factor ranging typically from 2.0 to 1/64, and used to directly modify the general form of the MLUT 362 output.

Second modified motion signal S is further modified by module 370 on a line-by-line basis to generate third modified motion signals by reducing the value of S using a fixed attenuation factor indicated by MotionReduceShift, depending on the total amount of motion detected for the previous line. This motion corresponds to the horizontal line above the current horizontal line in the current frame being processed as indicated by the signal TotalHLineMotion from the image characterization module. The purpose of this signal is to control—based on a threshold MaxHlineMot—the effect of a sudden vertical change in motion, since there is no mechanism to account for these types of changes like in the case of the motion median filter 322 (FIG. 3). The MaxHlineMot input helps in isolated cases where the overall noise reducer 26 (FIG. 1) is programmed with time constants that would cause temporal blur on a line basis. Only very large values of TotalHLineMotion will cause a reduction in S'; therefore, only a few bits are needed to denote the actual threshold value, MaxHlineMot, even though the maximum real detected motion can be as high as an 18-bit binary value for ITU-656 horizontal lines. Five bits are used to define MaxHlineMot, which will be internally shifted right 12 bits to match the horizontal line motion count.

Furthermore, as shown in FIG. 4, module 372 modifies the processed motion detection signal S by the actual value of the pixel being filtered as follows. If the value of the current pixel YCurrFrm (also indicated as A for the luminance path in FIG. 2) is between lowLevelNR and highLevelNR, then the value of S is passed through unmodified. However, if YCurrFrm is outside this range, then the value of S is modified (shifted) as indicated by LevelNRShift. This shift value is a four-bit quantity where [3:0] indicates up to a factor of 8 shift, and bit-4 indicates whether the shift is left or right.

S'=(A>LumaHighLevelNR||A<LumaLowLevelNR)?
((gLumaLevelNRshift & 0x20)?
S>>LumaLevelNRshift:
S<<LumaLevelNRshift):
S;

Motion control module 372 generates the corrected motion signal S', which is applied to the IIR structure of UV adjust module 306 shown in the FIG. 4. In the expression for S', >> denotes an arithmetic shift right and << denotes an arithmetic shift left (as in C-language syntax).

Referring to FIG. 4, UV adjust module 306 comprises an arithmetic operator 308 that subtracts a processed pixel value from the previous chrominance buffer 22B (FIG. 2) that corresponds in location with a chrominance pixel value from the current frame received on path 21B (FIG. 2). An absolute value operator 310 generates a signal mDetectUV representing the absolute value of the difference between the inputs to operator 308. Corrected motion signal S', derived from luminance path 21A (FIG. 2), is correlated with a simpler version of motion derived from msense (FIG. 3) and the absolute temporal frame difference between chroma samples, mDetectUV by a chroma motion adjust module 312. If the value of msense is much greater than mDetectUV, the value of S' for chrominance is increased by UVMotionShift. On the other hand, if msense is much smaller than mDetectUV, then the value of S' is reduced by the same amount as before. This processes performed by module 312 is summarized below. The hardware implementation should be careful to keep the results of the subtraction below in the range [0.255].

Suv'=(msense<(mDetectUV−uvLowCorrelationRange))?
S'>>uvMotionShift:
((msense>(mDetectUV+uvHighCorrelationRange))?
S'<<uvMotionShift:
S');

In addition to the chrominance signal modification described above, an arithmetic multiply operator 314 multiples a fixed factor uvMotGain, that typically ranges from 4.0 (shift left by two) to ¼ (shift right by two), by the output of the chroma motion adjust module 312 to generate adjusted chrominance motion signals SUV'.

Figure 6:
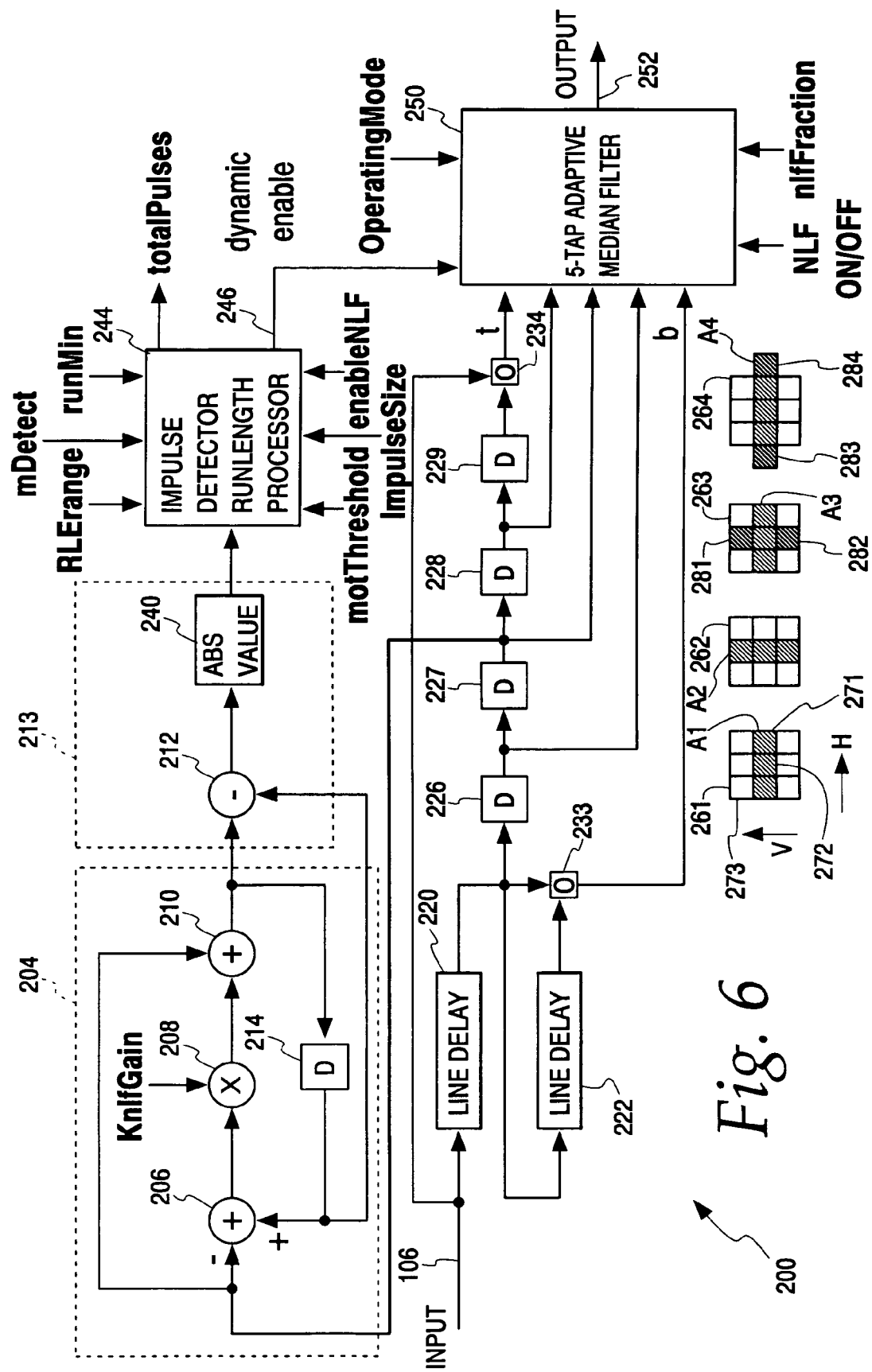
FIG. 6 is a schematic block diagram of a first embodiment of an impulse reducer in the form of a motion adaptive non-linear filter shown in FIG. 1 incorporating an impulse detector.

Module 200 reduces impulsive-type noise in the video sequence. As shown in FIG. 6, one embodiment of module 200 includes an infinite impulse response filter 204 used as a horizontal low pass filter that comprises arithmetic operators 206, 208, and 210 that perform that operations of addition, multiplication, and addition, respectively. A delay operator 214 is connected as shown. A differential processor 213 includes an arithmetic operator 212 that performs the operation of subtraction and an absolute value operator 240. Operator 212 detects changes in the output of filter 204 and is further processed by operator 240 in order to detect impulsive steps by an impulse detector 244.

Input 106 receives first filtered signals from filter 100 and delays the signals with delay lines 220 and 222. Additional signal delays are provided by delay operators 226–229 connected as shown. The output of delay 227 provides an input to filter 204. Selection operators 233 and 234 are used to modify the horizontal/vertical nature of an impulse reducer, such as a median filter 250. Operator 233 selects between a pixel 281 of a pixel structure 263 and a pixel 283 of a pixel structure 264. Operator 234 selects between a pixel 282 of structure 263 and a pixel 284 of structure 264.

The absolute value of the output of filter 204 is generated by an absolute value operator 240. An impulse detector 244, organized as a run length processor, generates filter control signals on a path 246. A five-tap adaptive median filter 250 generates second filtered pixel values, including impulse-reduced pixel values, on an output path 252.

Module 200 is based on an impulse reducer, such as a two-dimensional median filter structure 250, that can be configured in several operating modes.

define MED_MODE_HORZ 0 // 3-tap Horizontal Median Filter
define MED_MODE_VERT 1 // 3-tap Vertical Median Filter
define MED_MODE_HV 2 // 5-tap Horizontal/Vertical (Cross) Median
define MED_MODE_HORZ5 3 // 5-tap Horizontal only Median Filter The basic functionality of the median filter 250 is based on an order ranking of all input values and a selection of the value that resides arithmetically in the middle of the distribution. The output of the median filter is based on the value of the center pixel according to the following algorithm (where c denotes the value of the center pixel, fraction_of_c denotes a scaled down version of c by a shift indicated with the register nlfFraction, and m denotes the value of the ranking operator):

fraction_of_c=(c>>nlfFraction);
result=(abs(m−c)>fraction_of_c)? m: c;

If the two-dimensional filter 250 is used for every pixel in the image, it will successfully reduce impulsive noise, but it will also either soften the image and may produce non-linear artifacts that will be detrimental for further compression. Non-linearities are especially visible when using the median filter in the vertical 3-tap mode. The median filter 250 is turned on when the input sequence requires it and in the areas that are most critical for operation, especially in cases where there are many impulsive steps.

The input to the impulse reduction module 200 comes directly from the output of the recursive noise reduction module 100 over path 106. As shown in FIG. 2, path 106 includes a path 106A that transmits a processed luminance value and a path 106B that transmits a processed chrominance value. The same data path 106 is used for both the luminance and chrominance signals in FIG. 6. The processing starts by using IIR filter 204 to low-pass the pixel values in order to eliminate high frequency details and to be able to give a clean signal to the RunLength Processor 250. This low-pass filtering operation is especially useful when the recursive noise reduction filter is not operational.

Figure 7:
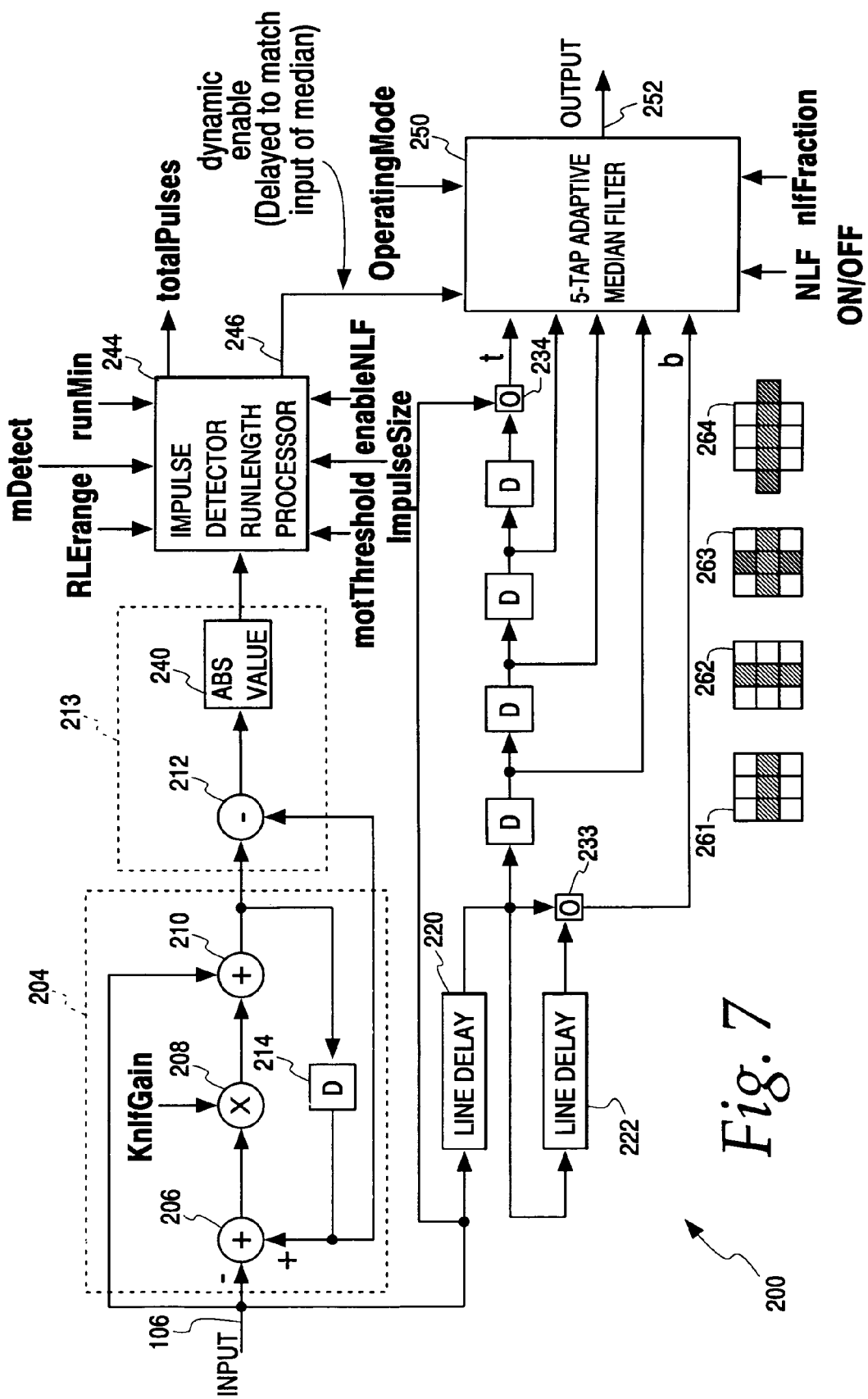
FIG. 7 is a schematic block diagram of a second embodiment of the motion adaptive non-linear filter shown in FIG. 1.

FIGS. 6 and 7 show two alternative architectures for module 200 depending on where to apply the matching processing delays. In both FIGS. 6 and 7, it is implicitly assumed that there are sample delays in the connecting arrows so that the processing samples line up as indicated by the shaded squares in the structures 261-264 at the bottom of the figures. Structures 261-264 represent areas of the current frame of pixels that define a vertical direction V and a horizontal direction H. A current horizontal line of pixels is represented by a line 271 that includes a pixel 272 currently being processed by preprocessor 10. A horizontal line 273 above line 271 was processed before line 271. Therefore, the boxes indicating line delays (e.g., 226–229) are assumed to be configured so that the timing of the samples into the median filter 250 line up as indicated in the cross-hatched two-dimensional structures 261–264 at the bottom of FIGS. 6–7. (This implies delays of approximately one line (e.g., line 271) when horizontal and processing delays are taken into account.)

The cross-hatched structures also represent areas of a frame indicated by A1–A4. The cross hatched areas constitute the pixels in the frame to be processed by filter 250.

FIG. 7 assumes that there is a matching delay at the run length processor 244. FIG. 6 assumes that all results are delayed by approximately one line and the needed processing delay in the run length processor 244 is reduced to a few samples (adjusted appropriately in the line delay elements).

Referring to FIG. 6, impulse detector 244 identifies the occurrence of high contrast steps in the picture or image represented by the pixels of the current frame. These steps are one type of impulsive noise that is manifested as strikes and partial line dropouts.

Impulse detector 244 generates a first signal when it interprets a change in the value of the absolute difference between adjacent pixels as a discontinuity (impulseSize) and therefore the potential for finding a step in the input pixels. When the absolute value of the difference between adjacent horizontal pixels is below a threshold range RLErange and the value of the original pixel is very bright or very dark (outside the range impulseLevelHigh—impulseLevelLow), detector 244 generates a second signal by identifying the discontinuity in pixel values as an impulse or step to be considered for elimination. At this point, detector 244 starts counting the length of the step, and if it is greater than runMin (a predetermined number of consecutive pixels), detector 244 marks the step as a potential step pulse transition by generating a third signal. If the step happens to coincide with a large amount of motion detected (motThreshold) for the area, dynamicEnable, a filter control signal, is set as an indication that a step/strike/speckle exists in the input video, and the value of totalPulses is incremented.

Module 200 will be active if it has been enabled by enableNLF=true and if there has been a step detected of at least a duration in pixels of runMin and if the motion detected has exceeded a certain threshold value motThreshold. System 10 considers only impulse steps of value greater than ImpulseLevelHigh or less than ImpulseLevelLow for counting and evaluating. If adjacent pixel values are within the range RLErange, they are considered as part of a continuous step.

The detector 244 process described above is not intended for detecting salt-and-pepper noise, although it may be used to do so, but yielding a redundant operation. However, when attempting to reduce salt-and-pepper impulsive noise, mode 0 or mode 3 of filter 250 (i.e., a 3 or 5-tap horizontal median filter) is effective and not very detrimental (in terms of non-linear artifacts generated) to the video quality.

The adaptive 5-tap median filter 250 performs the two-dimensional filter structures 263–264 indicated in FIG. 6. The top (t) and bottom (b) input values to the median filter are selected by operators 233–234 according to the OperatingMode. This selection is indicated by pixels 281–284 of structures 263–264. The selection is done by the operators 233–234 labeled 'o' by means of the OperatingMode control signal (for simplicity, not shown in FIG. 6) in the manner previously described.

There are several static control signals indicated in FIG. 6. Hierarchically, at the very top is NLF ON/OFF, which, regardless of other operating modes, simply lets the center pixel value (e.g., pixel 272) go through filter 250 as if it were never filtered. The register enableNLF enables the operation of the non-linear filter 250 as indicated by OperatingMode. If the non-linear filter 250 is required to change every pixel regardless of its relationship to the median value, then the contents of nlfFraction is set to a high value so that the fraction of the center pixel is very small and any median value will replace the center.

Another embodiment of module 200 is shown in FIG. 7, wherein like numbers refer to like parts. Those skilled in the art will understand the operation of the FIG. 7 embodiment based on the description of the FIG. 6 embodiment.

Figure 8:
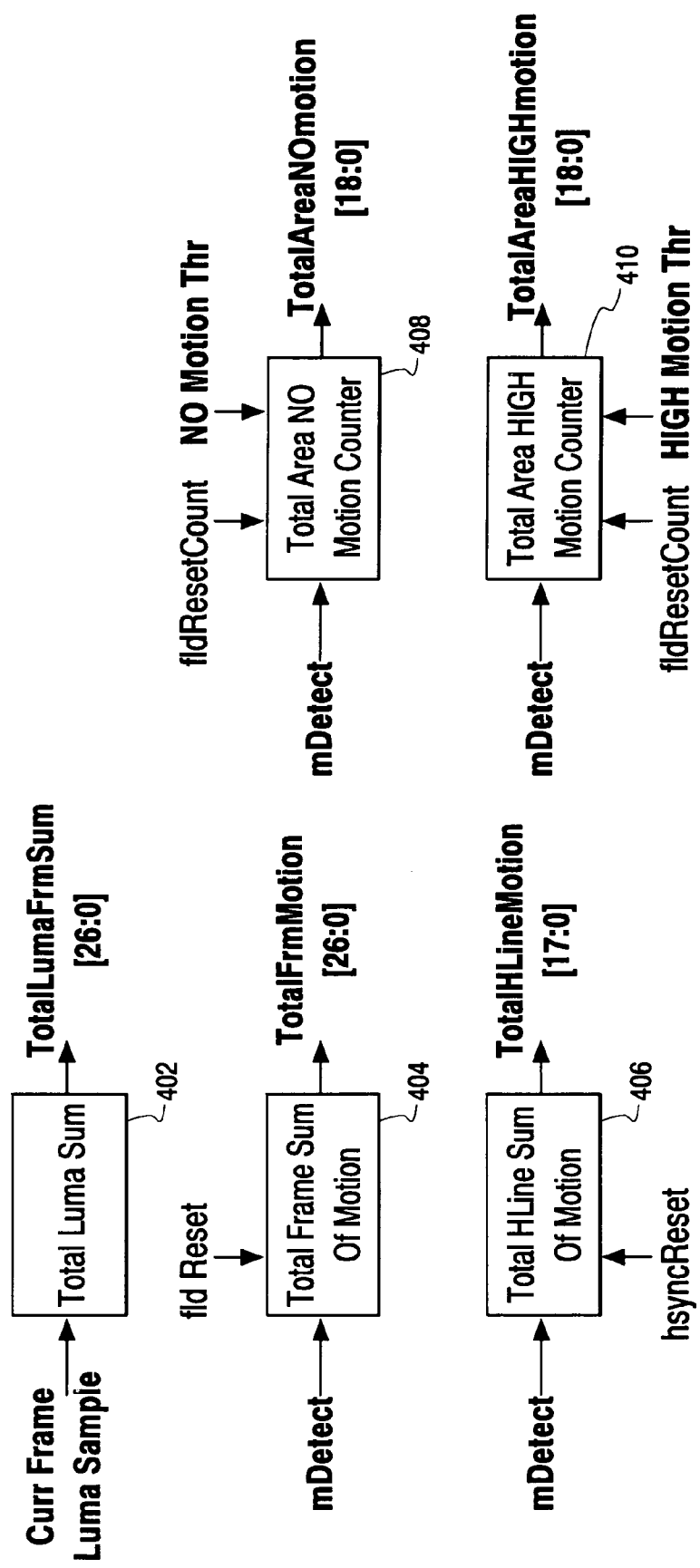
FIG. 8 is a schematic block diagram of the image characterization module shown in FIG. 1.

Throughout this specification, the term image sequence characterization is used to indicate the process of gathering information and making decisions based on video sequence information. The hardware involved for this task is essentially a set of accumulators and counters that keep track of various spatial and temporal data. FIG. 8 shows the signal widths needed for image resolution according to ITU-R656. Horizontal and vertical synchronization signals are used to reset and start accumulating/counting operations, but the values of the previously computed field or line remain stable for the duration of the current field or line until the next synchronization event.

TotalLumaFrmSum is calculated by a counter 402 that keeps track of the sum of all luma pixels in the current frame. This value is an early indication of the average DC value when scaled down by the total image size.

TotalFrmMotion is calculated by a counter 404 that adds the motion detection signal mDetect for the entire current frame. TotalHLineMotion is a horizontal line motion signal calculated by a counter 406 that adds the mDetect signals for the horizontal line above the current horizontal line that includes a pixel being processed (e.g., line 273 shown in FIG. 6). FIG. 8 indicates that counter 406 is reset at every vsync or every hsync of a frame. Firmware is responsible for reading the values at the appropriate interrupt before the counters are reset automatically by the hardware.

The area indicators TotalAreaNOmotion and TotalAreaHIGHmotion are calculated by counters 408 and 410, respectively. TotalAreaNOmotion is a low motion signal corresponding to motion of one or more images and TotalAreaHIGHmotion is a high motion signal corresponding to motion of one or more images. Counters 408 and 410 always count up by one as they are indicators of how many pixels fall within the threshold values indicated by the registers. One example of area is the area indicated by structures 261–264 (FIG. 6). At the end of each field, these registers contain an indication of how many pixels are at the extreme motion detection ranges indicated by the various thresholds. This information is used to globally change motion parameters, including the values of MLUT 362.

The overall operation of preprocessor system 10 will be described in the context of the interaction between hardware and firmware to provide dynamic algorithmic control in order to reduce the noise in the input sequence.

The operation of preprocessor system 10 depends on the interaction between hardware and firmware. The hardware is set up by the firmware via control registers and under the assumption of an input video sequence of pixels on path 12 has mild noise reduction requirements. As the sequence progresses, the image characterization module 400 collects temporal and spatial features of the input sequence for the firmware to analyze. The firmware can determine after several frames have passed, more effective parameters for the noise reduction hardware.

As an example, for the recursive noise reduction process, the firmware may determine that the input video has very little global motion. This is indicated by low values for TotalFrmMotion (typically less than 10% of total frame motion), and at the same time a high value for TotalAreaNoMotion (better than 80% of total frame locations).

When there is a change of scene in the input sequence (e.g., a change in an image), it is possible that the change of scene is accompanied by very large change in overall picture brightness (high value of TotalLumaFrmSum), which would cause a detrimental blur effect if the recursive filter is operating with an "aggressive" MLUT 362. By reading this sudden change, the firmware can temporarily set the global MotionGain and uvMotGain registers to reduce, eliminate or partially disable the effect of the recursive filter 100 (FIG. 1) while the transition lasts.

Initially, the non-linear noise reduction filter 250 (FIG. 6) is turned OFF or set to operate in 3-tap horizontal mode. If the number of impulsive steps indicated by totalPulses increases for more than a few seconds-worth of video, the firmware may make the decision to progressively use more effective operating modes at the expense of non-linear artifacts.

Sudden large transitions in TotalFrmMotion towards zero (below 5% of total possible frame motion) and correlating spikes in the values of both TotalAreaNoMotion and TotalAreaHighMotion at specific intervals may indicate the existence of a 3:2 pull-down sequence. If sampled values of TotalHLineMotion confirm that there has been no significant line-to-line motion for the same frames, then this would be a further indication of repeated fields at the 3:2 cadence.

A rapid but progressive decrease in the value of TotalLumaFrmSum may indicate a fade-to-black video transition, especially if TotalAreaNoMotion remains fairly constant within the thresholds set for low/high motion.

These transition indications of 3:2 pull-down, fade-out, scene changes, flash changes, etc. can also be derived from the bit utilization observed during encoding. However, when obtained at this stage of processing, preprocessor 10 is provided with at least one frame-time look-ahead warning of the image sequence trends that may affect the quality of encoded video.

The above-described embodiments enable a preprocessing system that is both effective and economical. The preprocessing system provides video that is properly band limited, with reduced artifacts and reduced noise. Furthermore, the preprocessor system provides various parameters that characterize the nature of the input video so the encoder can make better assumptions as to the best ways to compress the video sequence.

Figure 9:
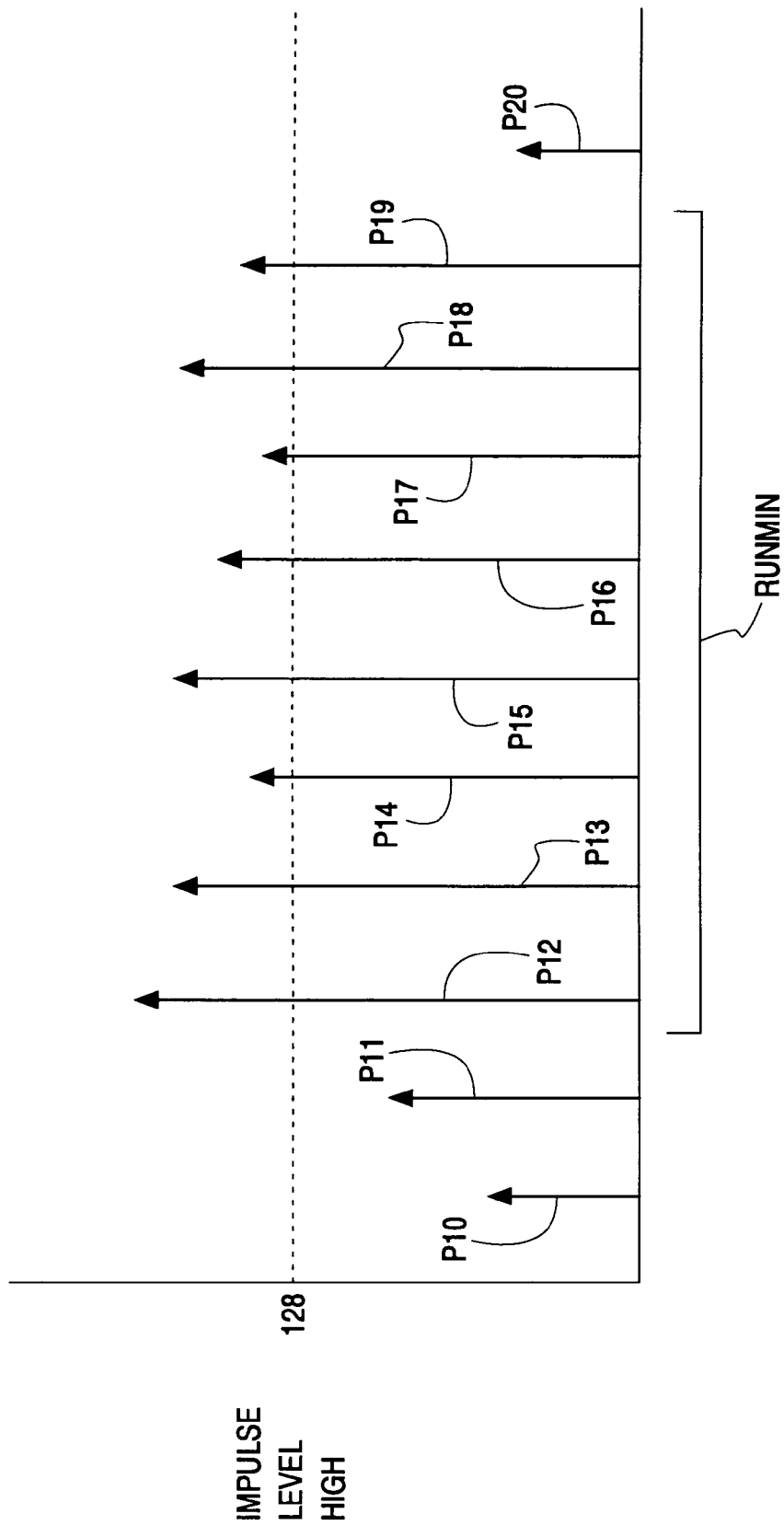
FIG. 9 is a graph illustrating a step impulse for a runMin value.

FIG. 9 is a graph illustrating the operation of one embodiment of impulse detector 244 (FIG. 6). Pixels P10–P20 are pixels of various amplitudes lying in the same horizontal line of a frame. A threshold amplitude ImpulseLevelHigh is compared to the amplitudes of the various pixels. A runMin parameter defines the number of consecutive pixels used to determine a step impulse and the length of the step impulses. For the runMin value of 8 consecutive pixels shown in FIG. 9, a step impulse is counted because all pixels P12–P19 have an amplitude greater than ImpulseLevelHigh and also meet other conditions. The conditions met by pixels P12 and P13 are defined by the following example:

(Abs(P13−P12)<RLErange) AND ((P13<ImpulseLevel Low) OR (P13>ImpulseLevelHigh))

RLErange is a value within which a change in input is considered constant. For example, if this value is 2, any input pixel with a value P is considered the same as those adjacent pixels with values P+2 and P−2. ImpulseLevelHigh is a high amplitude threshold for detecting impulses and ImpulseLevelLow is a low amplitude threshold for detecting impulses.

The values of ImpulseLevelHigh and ImpulseLevelLow can be derived from average pixel amplitude values for an entire frame. For example, the average amplitude can be calculated from the TotalLumaFrmSum value described in connection with FIG. 8 divided by the total number of pixels in the frame. ImpulseLevelHigh can be set to 1.5 times the average amplitude, and ImpulseLevelLow can be set to 0.5 times the average amplitude. In general, pixel amplitudes greater than ImpulseLevelHigh correspond to very bright pixels, and pixel amplitudes less than Impulse Level Low correspond to very dark pixels.

The other pixels in the run length also meet the foregoing conditions. As a result, the pixels runMin pixel group are counted as a step impulse because each of the pixels meets the conditions during the runMin duration, e.g., 8 pixels in this example. In the example of FIG. 9, the RLErange is 16, the amplitude of P13 is 140, the amplitude of P12 is 137, ImpulseLevelLow is 32, ImpulseLevelHigh is 128, the absolute value of P13−P12 is 3, and runMin is 8. Of course, a step impulse also is counted if the conditions are met by pixels with amplitudes below the ImpulseLevelLow value.

Figure 10:
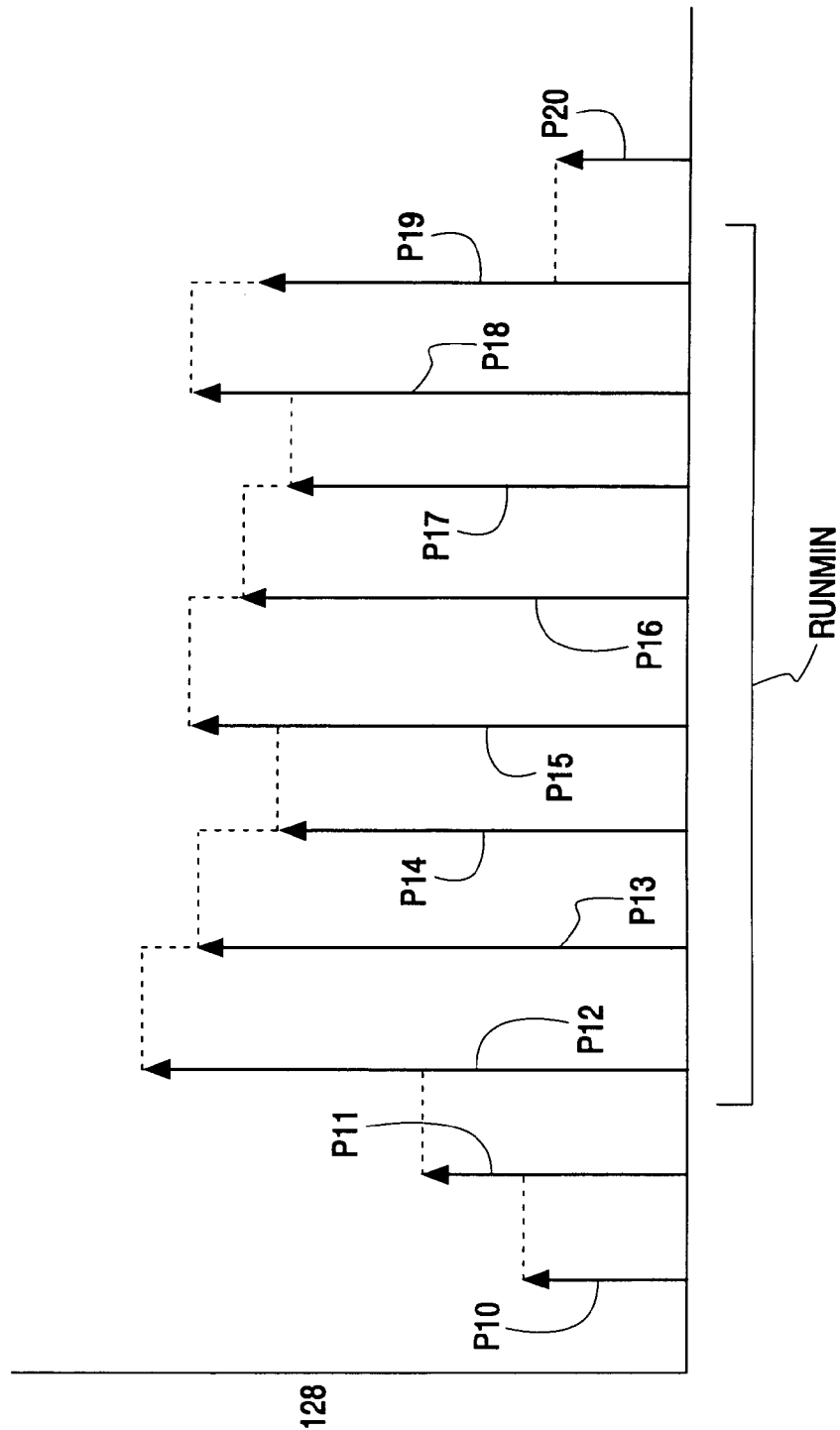
FIG. 10 is a graph like FIG. 9 in which step functions have been indicated by dotted lines.

FIG. 10 illustrates the pixels of FIG. 9 in which step functions have been indicated by dotted lines. Pixels P12–P19 represent a step impulse up in amplitude compared to the amplitudes of pixels P10–P11 and P20.

Figure 11:
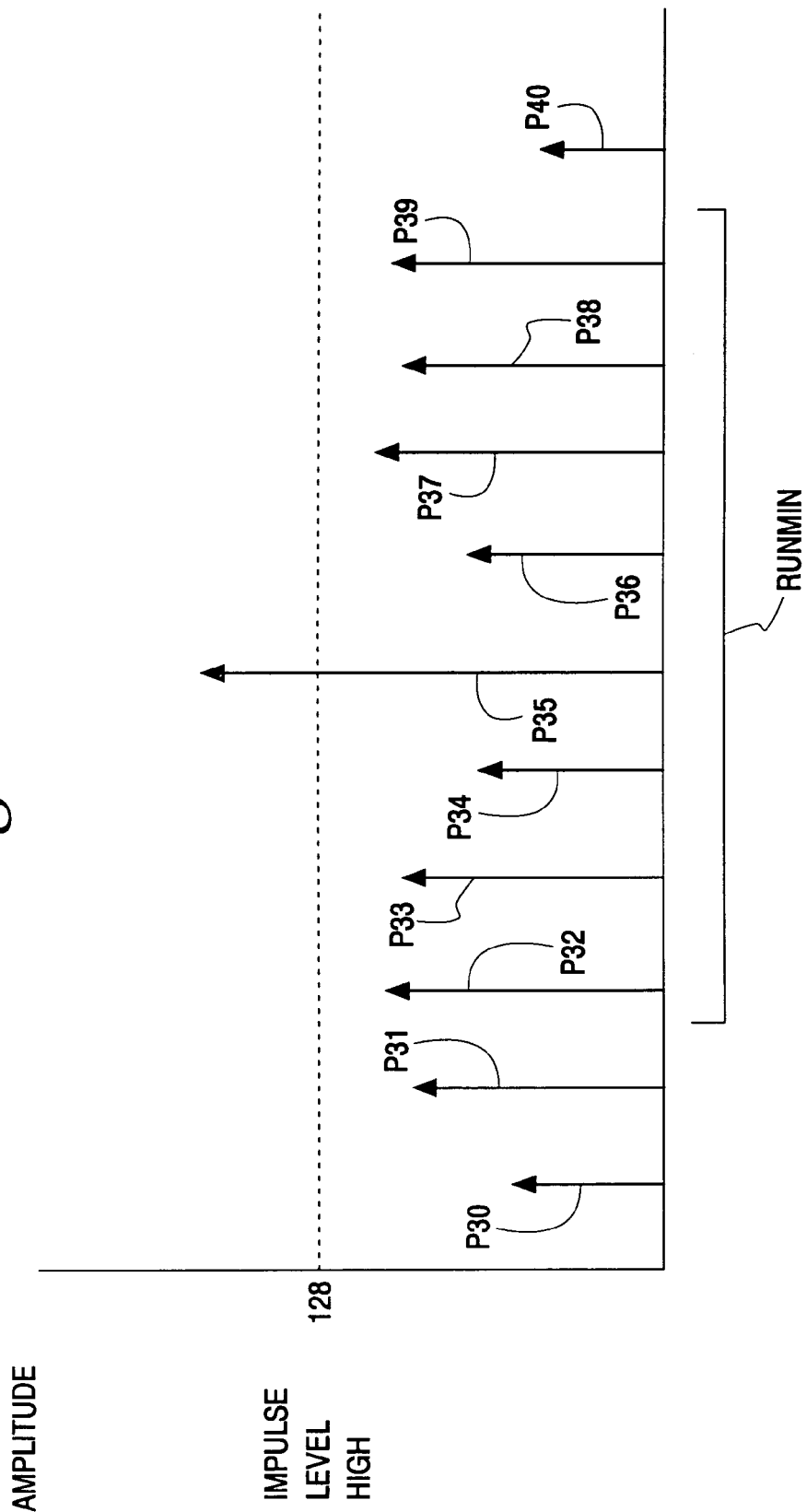
FIG. 11 is a graph illustrating pixel values that do not form a step impulse.

FIG. 11 illustrates a group of pixels P30–P40 lying along the same horizontal line of a frame. The pixels during run length runMin are not counted as a step impulse because they do not meet the conditions described above. For example, only pixel P35 has an amplitude greater than ImpulseLevelHigh.

Figure 12:
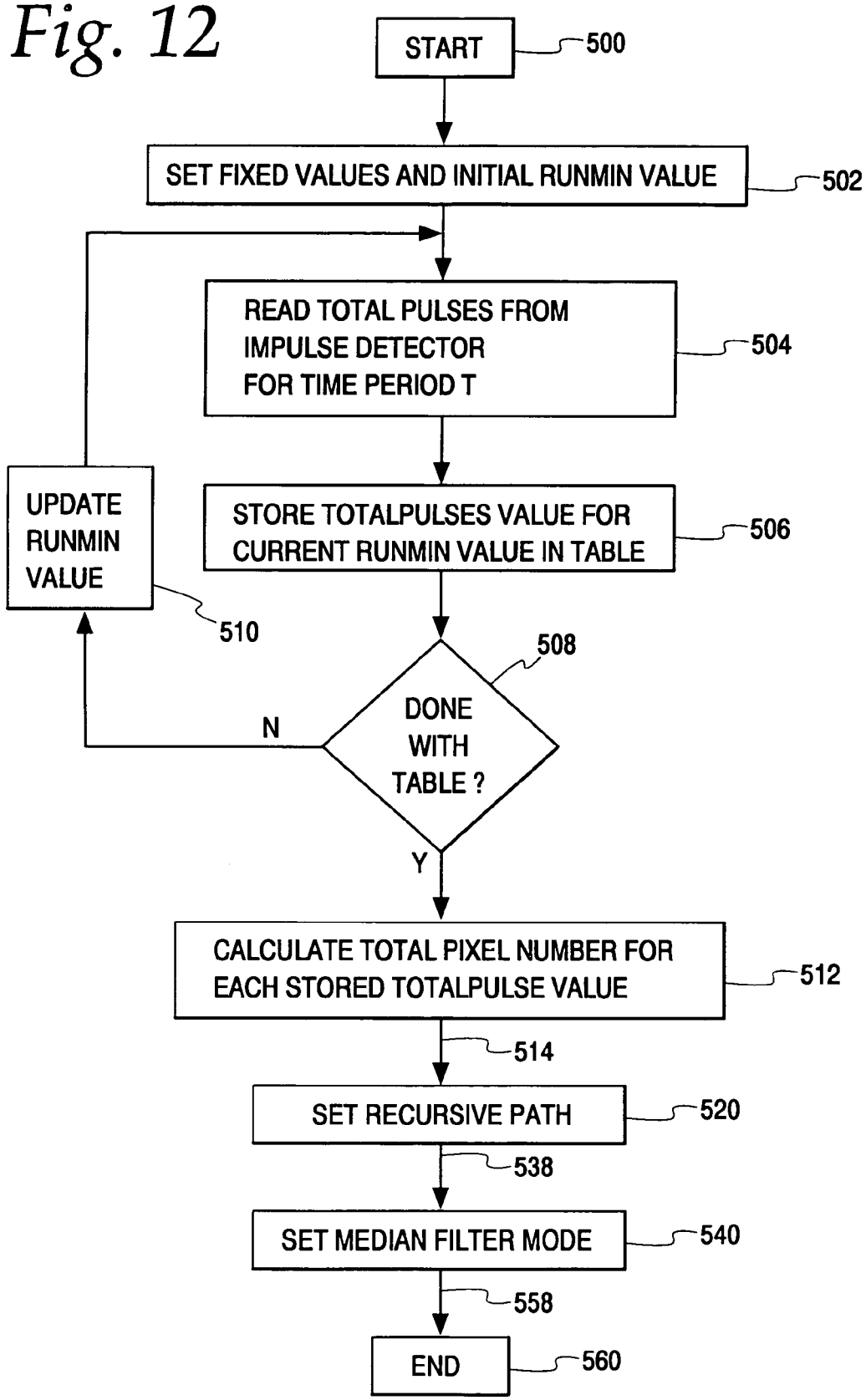
FIG. 12 is a flow diagram illustrating one algorithm executed by the impulse detector shown in FIG. 6.

FIG. 12 describes one embodiment of another algorithm carried out by impulse detector 244 in order to determine the recursive path for previous frame 22 and the OperatingMode of median filter 250 (FIG. 6). The operation begins with a step 500 and continues with a step 502 in which fixed values are set and an initial runMin value is set. The fixed values include runMin values that are set as shown in the following Table 1:

TABLE 1

| RunMin Value | Number of Impulse Steps Counted | Total Pixels Within Impulse Steps |
|---|---|---|
| 256 | IM0 | TP0 |
| 128 | IM1 | TP1 |
| 64 | IM2 | TP2 |
| 32 | IM3 | TP3 |
| 16 | IM4 | TP4 |
| 8 | IM5 | TP5 |
| 4 | IM6 | TP6 |

The fixed values also include the following:
AVG=TotalLumaFrmSum/Total pixels in picture frame or during processing time T;
enableNLF=true
RLErange=8
motThreshold=32
ImpulseLevelHigh=1.5 times AVG
ImpulseLevelLow=0.5 times AVG
nlfFraction=4

As an example, processing time period T may be 1 second, during which a collection of pixels is evaluated. Typically, about 30 frames of pixels are evaluated during a one second time period.

In a step 504, the total number of impulse steps (calculated as described in connection with FIG. 9) are counted or read for a time period T or for a group of pixels, such as a frame. In a step 506, the number of impulse steps counted is stored as an IM value for the current runMin value in Table 1.

In a step 508, the algorithm determines whether all the relevant values in Table 1 have been processed. If not, in a step 510, the runMin parameter value is updated with the next sequential value from Table 1, and the algorithm loops back to step 504.

If the answer to step 508 is affirmative, the total pixel number for each stored IM totalpulse value in Table 1 is calculated and stored in a step 512. The total pixel number is calculated by multiplying the impulse steps counted during time period T for a particular runMin value times the number of pixels corresponding to the applicable runMin value. In the example of FIG. 9, the number of impulse steps is multiplied by 8, because the runMin value is 8 (i.e., 8 consecutive pixels per run length). After each multiplication, a total pixel value is stored as a TP value in Table 1.

After completing step 512, the algorithm follows a path 514 to a step 520 that sets the recursive path that determines whether data for previous frame 22 is obtained from path 106 or path 252 (FIG. 1).

After completing step 520, the algorithm follows a path 538 to a step 540 that sets the operating mode of median filter 250 (FIG. 6).

After completing step 540, the algorithm follows a path 558 to an end step 560.

Figure 13:
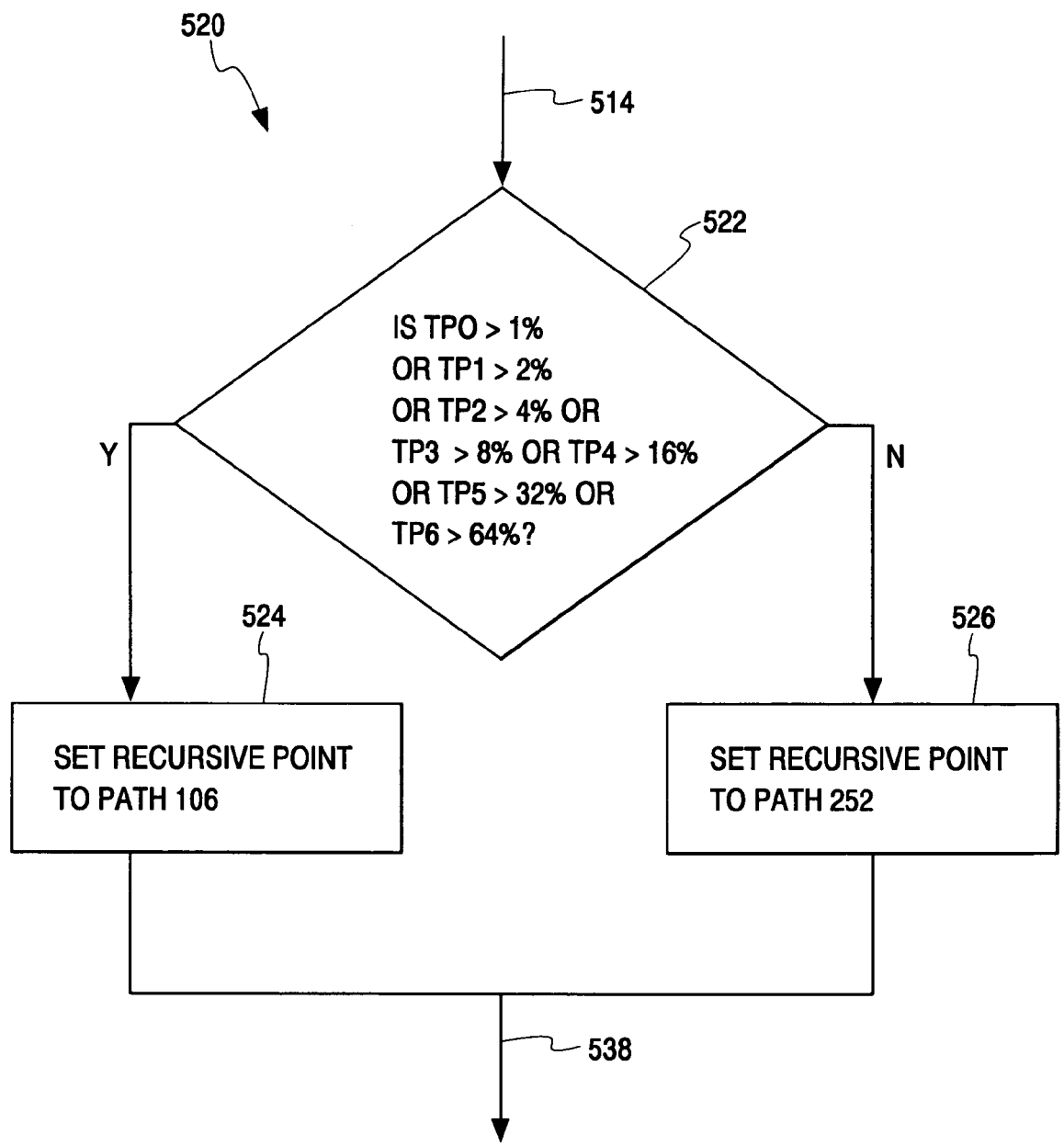
FIG. 13 is a flow diagram illustrating an algorithm used to set the point at which data is taken for the previous frame shown in FIG. 1.

FIG. 13 describes in more detail step 520 of FIG. 12 that sets the recursive path. The purpose of the operation described in FIG. 13 is to avoid using a reference previous frame 22 that contains many non-linear impulse steps since this would create non-linear artifacts that would potentially persist over several frames depending on the time constant of the recursive filter 100.

The operation of step 520 begins with a step 522 which compares the TP values stored in Table 1 with various percentages of the total number of pixels processed in time period T or present in a frame, whichever is applicable. The recursive point is set to path 106 in a step 524 or to path 252 in a step 526 according to the following expression:

If (TP0>1% OR TP1>2% OR TP2>4% OR TP3>8% OR TP4>16% OR TP5>32% OR TP6>64%)
Then
Set recursive point to path 106
Else
Set recursive point to path 252.

The % term in the previous expression indicates the number of pixels corresponding to the total pixels in processing time period T or the total number of pixels in a frame, which ever criteria is used to determine the TP values in Table 1. For example, if 345,600 pixels are processed during time period T, then 1% of 345,600 is 3,456 pixels. Thus, in the expression TP0>1% shown in FIG. 13, the value of TP0 from Table 1 is compared with 3,456.

By using the algorithm described in FIG. 13, system 10 can determine the likelihood that the data in the current frame will produce more artifacts if used as a reference in the recursive filter 100, since these impulse steps will persist over several frames if the filter 100 time constant is long. In such a situation, switch 32 (FIG. 1) is set to take data for previous frame 22 from point 106.

FIG. 14 describes in more detail step 540 shown in FIG. 12 for setting the mode of filter 250. In a step 541, a value TP is set equal to the maximum TP value stored in Table 1.

In steps 542, 546, 550 and 554, the algorithm compares the TP value with various numbers of pixels expressed as a percentage of the total number of pixels processed during time T or in a frame, whichever criteria was used to calculate the IM0–IM6 values shown in Table 1. In other words, the % term as shown in FIG. 14 has the same meaning explained in connection with FIG. 13.

In a step 542, if TP is greater than 20%, then in a step 5544, filter 250 is set to the MED_MODE_VERT 1 mode of operation using the 3-tap vertical median filter. If TP is not greater than 20%, the operation passes to a step 546.

In step 546, if TP is greater than 10%, then in a step 548, filter 250 is set to the MED_MODE_HV 2 mode of operation using the 5-tap horizontal/vertical median filter. If TP is not greater than 10%, the operation passes to a step 550.

In step 550, if TP is greater than 5%, then in a step 552, filter 250 is set to the MED_MODE_HORZ 5 mode of operation using the 5-tap horizontal only median filter. If TP is not greater than 5%, the operation passes to a step 554.

In step 554, if TP is greater than 2%, then in a step 556, filter 250 is set to the MED_MODE_HORZ 0 mode of operation using the 3-tap horizontal median filter.

If TP is not greater than 2%, then in a step 557, the mode of operation of filter 250 is set to the default mode in which filter 250 is turned off so that the center pixel value in a group of pixels being processed goes through filter 250 as if it were never filtered.

The operation described in FIG. 14 may be expressed as follows:
TP=max(TP0, TP1, TP2, TP3, TP4, TP5, TP6)
If TP>20%, set filter 250 to MED_MODE_VERT 1
Else if TP>10%, set filter 250 to MED_MODE_HV 2
Else if TP>5%, set filter 250 to MED_MODE_HORZ5 3
Else if TP>2%, set filter 250 to MED_MODE_HORZ 0
Else, set filter 250 to default mode.

For all the % values shown in FIG. 14, it is assumed that the values are valid for a normal operating mode. For more aggressive operation (e.g., more noise reduction) the actual values (thresholds) of the percentage % values should be reduced. For example, a very aggressive approach would be:
If TP>5%, set filter 250 to MED_MODE_VERT 1
Else if TP>2.5%, set filter 250 to MED_MODE_HV 2
Else if TP>1.25%, set filter 250 to MED_MODE_ HORZ5 3
Else if TP>0.625%, set filter 250 to MED_MODE_ HORZ 0
Else, set filter 250 to default mode.

Terms used to describe the embodiments shown in the drawings are further explained as follows:

Adaptive indicates changes in the processing of data as a result of an evaluation of the input video or another time critical signal like motion or per-pixel signal quality Dynamic indicates changes in the nature of processing generated mainly by firmware via control registers.

Gain indicates a multiplication factor that could be greater or smaller than unity. When the gain is less than unity, it can be called attenuation or right shift operation.

Image sequence indicates a plurality of video frames, each frame consisting of two interlaced fields. This term is used interchangeably with video sequence, picture sequence, frame sequence, temporal sequence, and video material.

Impulse/step indicates contrast signal steps along the horizontal line and clearly visible on the television/monitor screen or on an oscilloscope display.

Impulsive noise indicates a type of random noise characterized by large random variations in the picture.

Line drops indicates impulsive noise that spans a multitude of pixels and that appears on an oscilloscope as pronounced step transitions along the horizontal video line.

MLUT indicates a motion look-up table. In this specification, the table 362 is fully programmable.

NLF indicates a non-linear filter, synonymous with an impulse noise reduction filter.

Noise reduction indicates the process of reducing—not necessarily eliminating—random noise in the input video.

Salt-and-pepper indicates a kind of impulsive noise that gives the impression that the picture has been sprinkled with a random amount of very bright and very dark dots one or two pixels wide.

Scratches indicates high contrast image discontinuities that resemble scratches in old film content.

Speckles indicates a kind of impulsive noise that is like salt-and-pepper but not limited to one or two pixels.

Tape Noise indicates random noise generated by a video tape, especially VHS tape. In addition to white Gaussian distribution noise, tapes can also exhibit temporal jitter and time base errors.

Each of the registers identified in FIGS. 1–8 is described in more detail in the following section.

Adaptive Motion Detection and Control Motion Detection Setup Register

| Bit Field | Name | Description |
|---|---|---|
| 9:7 | MLPscale | Motion Horizontal Low Pass filter scale down factor. Implemented as a Shift Right operator of 3 bits. The filter coefficients are fixed. This gain helps extend the range of MLUT 362 |
| 6 | MedgeEnable | Enable horizontal motion edge detection |
| 5:3 | medgeThr | Motion edge detection threshold sensitivity. Range [0 . . . 28] Actual value used is: {medgeThr[2:0], 2'b00} |
| 2 | Width select | 0: most significant 5-bits (saturated) are stored 1: all the bits are stored in line buffer |
| 1 | Bypass MVF | Bypass vertical motion low pass filter |
| 0 | Bypass MHF | Bypass horizontal motion median filter |

Motion Look-Up Table Coefficients Register

Each write to this register writes 4-bytes of motion coefficients to the MLUT 362. The address is cleared to zero at each field synch. To write the entire table, 8 consecutive writes are required (4×8=32). After vsync reset, each read gets 4 coefficients at a time starting at location zero.

| Bit Field | Name | Description |
|---|---|---|
| 31:20 | MLUT3 | Coefficient 3 |
| 23:16 | MLUT2 | Coefficient 2 |
| 15:8 | MLUT1 | Coefficient 1 |
| 7:0 | MLUT0 | Coefficient 0 |

Motion Adaptive Recursive Structure

Motion Gain Register

| Bit Field | Name | Description |
|---|---|---|
| 31:24 | MaxHlineMot | Threshold value for the maximum amount of motion to be considered for attenuating the gain of the motion signal. Only relatively large values of total motion will affect the motion detection control signal. The actual value used is as follows: MaxThreshold = (MaxHlineMot) << 9 |
| 23 | HLineMotEnable | Enables adaptive control of motion detection based on the total amount of motion detected on the previous line (above) |
| 22:12 | medgeDetectGain | Attenuation applied to the motion detection signal for a short period of time at the detection of a motion-edge. 00: Full attenuation, S is forced to zero 01: Attenuation ½ 11: No attenuation |
| 20:16 | motionReduceShift | Motion reduction based on amount of horizontal motion for previous line. |
| 15:0 | uvMotionGain | Chrominance motion adaptive control gain factor uvMotionGain[7]: 1 means shift right, 0 means shift left uvMotionGain[6:0]: binary shift right or left according to bit 7 |
| 7:0 | motionGain | Luminance motion adaptive control gain factor motionGain[7]: 1 means shift right, 0 means shift left motionGain[6:0]: binary shift right or left according to bit 7 |

Content Adaptive Motion Control Register

| Bit Field | Name | Description |
|---|---|---|
| 20:16 | LevelNRShift | Shift factor applied when current pixel value falls outside the range bounded by highLevelNR and lowLevelNR LevelNRShift[4]: 1 means shift right, 0 means shift left LevelNRShift[3:0]: binary shift right or left depending on bit-4 |
| 15:0 | highLevelNR | Upper threshold for application of Noise Reduction |
| 7:0 | lowLevelNR | Lower threshold for application of Noise Reduction |

Chroma Motion Adjustments Register

| Bit Field | Name | Description |
|---|---|---|
| 20:16 | uvMotionShift | Shift factor applied as adjustment to the luminance motion detection signal. LevelNRShift[4:0]: binary shift right or left depending on whether the luminance motion signal is much different from the chrominance temporal absolute difference signal. |
| 15:0 | uvHighCorrRange | Upper range for determining what constitutes high correlation between chroma and luma motion detection. |
| 7:0 | uvLowCorrRange | Lower range for determining what constitutes low correlation between chroma and luma motion detection. |

Non-Linear Motion Adaptive Noise Reduction

Non-Linear Control Register

| Bit Field | Name | Description |
|---|---|---|
| 23:22 | OperatingMode_UV | Controls the behavior of the 2D Median filter structure<br>0: MED_MODE_HORZ, 3-tap Horizontal Median Filter<br>1: MED_MODE_VERT, 3-tap Vertical Median Filter<br>2: MED_MODE_HV, 5-tap Horizontal/Vertical (Cross) Median<br>3: MED_MODE_HORZ5, 5-tap Horizontal only Median Filter |
| 21:20 | OperatingMode_Y | Controls the behavior of the 2D Median filter structure<br>0: MED_MODE_HORZ, 3-tap Horizontal Median Filter<br>1: MED_MODE_VERT, 3-tap Vertical Median Filter<br>2: MED_MODE_HV, 5-tap Horizontal/Vertical (Cross) Median<br>3: MED_MODE_HORZ5, 5-tap Horizontal only Median Filter |
| 19 | enableNLF_UV | Enable operation of non-linear filter as indicated by OperatingMode |
| 18 | enableNLF_Y | Enable operation of non-linear filter as indicated by OperatingMode |
| 17 | NLF ON/OFF (UV) | Completely turns ON/OFF the operation of the non-linear filter 250. When OFF, the value of this bit register is zero and the output of the median filter is always the input center pixel. |
| 16 | NLF ON/OFF (Y) | Completely turns ON/OFF the operation of the non-linear filter 250. When OFF, the value of this bit register is zero and the output of the median filter is always the input center pixel. |
| 15:8 | KnlfGainUV | IIR low pass filter 204 gain. This value is less than unity and implemented as a binary shift right of range [½ . . . 0] |
| 7:0 | KnlfGainY | IIR low pass filter 204 gain. This value is less than unity and implemented as a binary shift right of range [½ . . . 0] |

RunLength Processor Control Register

| Bit Field | Name | Description |
|---|---|---|
| 31:26 | UVnlfFraction | Used to shift left (reduce) the value of the center UV pixel during median filtering in order to set a content-based threshold for application of the median operator. |
| 25:20 | YnlfFraction | Used to shift left (reduce) the value of the center Y pixel during median filtering in order to set a content-based threshold for application of the median operator. |
| 19:12 | motThreshold | When mDetect is above this value, it is considered to be caused by a large impulsive discontinuity in the input. |
| 11:8 | runMin | Determines how many consecutive pixels (samples) of the same value (within RLErange) are considered to belong to the same pulse run. |
| 7:0 | RLErange | Value within which a change in input is considered constant. For example, if this value is 2, any input pixel with value P is considered the same as those adjacent pixels with values P + 2 and P − 2 |

Total Pulses Detected Register

The value in this register remains valid for the duration of the current field and is changed only at vertical sync. This way, the firmware can always read the value of the previous field at any time. These registers should not overflow.

| Bit Field | Name | Description |
|---|---|---|
| 31:16 | totalPulsesUV | Total pulses detected in the UV signal, as defined by the RunLength Control register |
| 15:0 | totalPulsesY | Total pulses detected in the Y signal, as defined by the RunLength Control register |

Impulse Level Threshold Register

This register defines the values used as low, high and size of impulses in order to determine their effect on processing.

| Bit Field | Name | Description |
|---|---|---|
| 23:16 | ImpulseLevelHigh | High threshold for detecting impulses of size specified below |
| 15:8 | ImpulseLevelLow | Low threshold for detecting impulses of size specified below |
| 7:0 | ImpulseSize | Value of what is consired an impulse when detected |

Image Characterization

The values in these registers remain valid for the duration of the current field and are changed only at vertical or horizontal sync, as the case may be. This way, the firmware can always read the value of the previous field at ay time. The status count registers should not overflow.

Sum of Luminance Register

| Bit Field | Name | Description |
|---|---|---|
| 26:0 | TotalLumaFrmSum | Adds all pixels in luma for the current frame |

Total Temporal Frame Register

| Bit Field | Name | Description |
|---|---|---|
| 26:0 | TotalFrmMotion | Adds all the motion detected between the current and previous frames |

Total Horizontal Line Motion Register

This register is double-buffered and guaranteed to always be ready by the firmware with stable values.

| Bit Field | Name | Description |
|---|---|---|
| 26:18 | HmotionLineCount | Indicates the horizontal line to which TotalHLineMotion belongs |
| 17:0 | TotalHLineMotion | Adds all the motion detected between line above in the current frame and the line above in the previous frame |

Total Area Containing No Motion Register

| Bit Field | Name | Description |
|---|---|---|
| 26:19 | NO Motion Threshold | All pixels with motion values detected below this threshold are considered static. |
| 18:0 | TotalAreaNoMotion | Counts all the pixel locations where there was no motion as indicated by the threshold value |

Total Area Containing High Motion Register

| Bit Field | Name | Description |
|---|---|---|
| 26:19 | HIGH Motion Threshold | All pixels with motion values detected above this threshold are considered largely moving. |
| 18:0 | TotalAreaHighMotion | Counts all the pixel locations where there was a lot of motion as indicated by the threshold value |

The foregoing embodiments offer the following advantages:

A dedicated impulsive noise detector improves noise reduction by reducing undesirable byproduct artifacts;

An impulsive noise reduction process is improved by application based on the impulse noise detector;

A motion signal is processed with a median operator to eliminate spurious temporal impulses in order to improve the effect of the temporal recursive filter;

A motion signal is examined for edges that represent moving boundaries of objects in order to properly control the time constant of the recursive filter and therefore prevent ghosting;

The effectiveness of spatial-filtering techniques alone is improved;

Two-dimensional detail is preserved by dynamic and adaptive application of spatial, temporal and impulsive filters;

Dynamic control on a pixel-by-pixel basis allows fine grain control of filtering process;

Frame-based, field-correlated motion detection is simpler to implement than motion estimation;

Adaptivity based on motion detection is simpler and as effective as implementation using block motion estimation; and Motion detection is only performed on luminance and derived by correlation for chrominance.

While the invention has been described with reference to one or more preferred embodiments, those skilled in the art will understand that changes may be made and equivalents may be substituted without departing from the scope of the invention. For example, impulse reducer 250 can be implemented by software in the manner previously described. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. Apparatus for reducing random noise in video pixels having digital pixel values by processing the pixel values, said apparatus comprising:

a memory arranged to store filtered pixel first values corresponding to first pixels processed by the apparatus during a first time period;

a motion detector responsive to differences between the first values and pixel second values corresponding to second pixels processed by the apparatus during a second time period later than the first time period to generate corrected motion signals representing detected motion of images represented by the first pixels relative to motion of images represented by the second pixels;

a first filter responsive to the corrected motion signals and the differences between the first values and second values to generate first filtered values;

an impulse detector arranged to perform a step impulse detecting process and to generate control signals in response to detection of step impulses represented by the second pixels; and an impulse reducer responsive to the first filtered values and the control signals to generate second filtered pixel values.

2. The apparatus of claim 1 wherein the second pixels correspond to lines comprising a horizontal first line and a horizontal second line, wherein a pixel being processed lies in the first line, wherein the images define edges and wherein the motion detector comprises:

a third filter responsive to pixels in the first and second lines and responsive to the differences between the first values and the second values to generate initial motion signals representing an estimate of the detected motion of images; and a transfer function module arranged to generate the corrected motion signals in response to the initial motion signals and characteristics of the images.

3. The apparatus of claim 2, wherein the apparatus further comprises an image sequence characterization module arranged to sum die initial motion signals for the second line to generate horizontal line motion signals, and wherein the transfer function module generates the corrected motion signals in response to the horizontal line motion signals.

4. The apparatus of claim 2 wherein the transfer function module comprises a programmable module that modifies the initial motion signals in response to coefficients and wherein the apparatus further comprises an image sequence characterization module arranged to generate low motion signals having values derived from the second pixels corresponding to motion of one or more of the images less than a predetermined first threshold and to generate high motion signals having values derived from the second pixels corresponding to motion of one or more of the images greater than a predetermined second threshold, and wherein the coefficients are varied in response to at least one of the low motion signals and the high motion signals.

5. The apparatus of claim 2 wherein the second pixels correspond to an area defining a horizontal direction and a vertical direction, wherein the images represent edges and wherein the characteristics of the images comprise:
the proportion of the area representing one or more of the images with motion greater than a predetermined first threshold or less than a predetermined second threshold;
the relation of the pixel being processed to one or more of the edges; and
a change in the vertical direction of one or more of the images.

6. The apparatus of claim 2 wherein the second pixels correspond to an area defining a horizontal direction and a vertical direction and wherein the transfer function module is ranged to generate the corrected motion signals in response to the initial motion signals, in response to the second pixels corresponding to motion of one or more of the images beyond a threshold, in response to the relationship of the pixel being processed to one or more of the edges, in response to the relationship of the pixel being processed to a change of motion of one or more of the images in the vertical direction, and in response to the value of the pixel being processed.

7. The apparatus of claim 2 wherein the third filter comprises:
a horizontal filter module responsive to the differences between the first values and the second values and responsive to pixel values in the horizontal first line to generate horizontal filtered signals; and
a vertical filter module responsive to the horizontal filtered signals and pixel values in the first and second lines to generate the initial motion signals.

8. The apparatus of claim 7 wherein the horizontal filter module comprises:
an absolute value operator arranged to generate absolute values corresponding to the differences between the first values and the second values;
a median filter arranged to generate median filtered values in response to the absolute values; and
a finite impulse response filter responsive to the median filtered values to generate the horizontal filtered signals.

9. The apparatus of claim 8 wherein the second pixels correspond to an area defining a horizontal direction and a vertical direction and wherein the transfer function module comprises:
a look up table defining a programmable transfer function altered in response to one or more of the extent to which the second pixels correspond to motion of one or more of the images less than a predetermined first threshold and the extent to which the second pixels correspond to motion of one or more of the images greater than a predetermined second threshold, the look up table being arranged to generate first modified motion signals in response to the initial motion signals;
an edge detector responsive to the horizontal filtered signals to generate edge signals indicating one or more of the edges;
an arithmetic operator arranged to combine the edge signals with the first modified motion signals to generate second modified motion signals;
a horizontal line motion control module arranged to modify the second modified motion signals to generate third modified motion signals depending on the relationship of the pixel being processed to vertical change of motion of one or more of the images in the vertical direction; and
a content adaptive motion control module arranged to generate the corrected motion signals in response to the third modified motion signals depending on the value of the pixel being processed.

10. The apparatus of claim 9 wherein the edge detector comprises a high pass filter.

11. The apparatus of claim 7 wherein the second pixels correspond to an area defining a horizontal direction and a vertical direction and wherein the transfer function module comprises:
a look up table defining a programmable transfer function altered in response to one or more of the extent to which the second pixels correspond to motion one or more of the images less than a predetermined first threshold and the extent to which the second pixels correspond to motion of one or more of the images greater than a predetermined second threshold, the look up table being arranged to generate first modified motion signals in response to the initial motion signals;
an edge detector responsive to the horizontal filtered signals to generate edge signals indicating one or more of the edges;
an arithmetic operator arranged to combine the edge signals with the first modified motion signals to generate second modified motion signals;
a horizontal line motion control module responsive to the second modified motion signals to generate third modified motion signals depending on the relationship of the pixel being processed to vertical change of motion of one or more of the images in the vertical direction; and
a content adaptive motion control module arranged to generate the corrected motion signals in response to the third modified motion signals depending on the value of the pixel being processed.

12. The apparatus of claim 11 wherein the arithmetic operator comprises a multiply operator.

13. The apparatus of claim 11 wherein the horizontal line motion control module is responsive to the sum the initial motion signals for the second line.

14. The apparatus of claim 1 and further comprising an image sequence characterization module arranged to at least estimate the average DC value of the second pixels and to at least partially disable the first filter in the event that the DC value exceeds a predetermined threshold.

15. The apparatus of the claim 1 wherein the pixel first values comprise first luminance values and first chrominance values, wherein the pixel second values comprise second luminance values and second chrominance values, wherein the first filtered values comprise first filtered luminance values and first filtered chrominance values and wherein the apparatus comprises:
a first luminance arithmetic operator arranged to generate first luminance arithmetic signals in response to first arithmetic relationships between the second luminance values and the first luminance values; and a first chrominance arithmetic operator arranged to generate first chrominance arithmetic signals in response to first arithmetic relationships between the second chrominance values and the first chrominance values, and wherein the first filter comprises:

a chrominance adjust module arranged to generate adjusted chrominance motion signals in response to the corrected motion signals depending on the extent of correlation between the luminance values and chrominance values;

a second luminance arithmetic operator arranged to generate second luminance arithmetic signals in response to second arithmetic relationships between the corrected motion signals and the first luminance arithmetic signals;

a second chrominance arithmetic operator arranged to generate second chrominance arithmetic signals in response to second arithmetic relationships between the adjusted chrominance motion signals and the first chrominance arithmetic signals;

a third luminance arithmetic operator arranged to generate the first filtered luminance values in response to third arithmetic relationships between the second luminance arithmetic signals and the second luminance values; and a third chrominance arithmetic operator arranged to generate the first filtered chrominance values in response to third arithmetic relationships between the second chrominance arithmetic signals and the pixel second values.

16. The apparatus of claim 15 wherein the first arithmetic relationships comprise one of adding and subtracting relationships, wherein the second arithmetic relationships comprises one of multiplying and dividing relationships and wherein the third arithmetic relationships comprise one of adding and subtracting relationships.

17. The apparatus of claim 1 wherein the step impulse detecting process comprises:
generating a first signal if the absolute difference between the pixel value being processed and an adjacent pixel value is less than a difference threshold value;
generating a second signal if the value of the pixel being processed is greater than a high level value or less than a law level value and the first signal is generated;
counting the number of consecutive pixels for which the second signal is generated; and
generating a third signal indicating a step impulse if the counting results in a number greater than a predetermined minimum number.

18. The apparatus of claim 17 wherein the impulse detector generates one of the control signals if a value of one of the corrected motion signals exceeds a motion threshold and the third signal is generated.

19. The apparatus of claim 17 wherein the impulse detector performs a process comprising:
storing the predetermined minimum number and a plurality of additional predetermined minimum numbers of different values;
performing the step impulse detecting process at least once for each of the predetermined minimum numbers;
counting the number of step impulses corresponding to each of the predetermined minimum numbers to generate a plurality of step impulse counts; and
determining the total number of pixels corresponding to each of the step impulse counts to generate a plurality of pixel counts.

20. The apparatus of claim 19, wherein the apparatus performs a process comprising:
determining the total number of pixels processed during the step impulse detecting process;
determining the fraction of the total number of pixels represented by each of the plurality of pixel counts to generate a plurality of fractions;
staring a plurality of predetermined fraction values corresponding to the plurality of fractions;
storing the first filtered values as the pixel first values if the plurality of fractions has a first predetermined relationship with respect to the plurality of predetermined fraction values; and
storing the second filtered pixel values as the pixel first values if the plurality of fractions has a second predetermined relationship with respect to the plurality of predetermined fraction values.

21. The apparatus of claim 19 wherein the impulse reducer operates in a plurality of different modes and wherein the apparatus performs a process comprising:
determining the maximum pixel count among the plurality of pixel counts;
determining the total number of pixels processed during the step impulse detecting process;
staring a plurality of predetermined fraction values corresponding to fractions of the total number of pixels processed; and
selecting one of the plurality of different modes depending on the relationship between maximum pixel count and the plurality of predetermined fraction values.

22. The apparatus of claim 1 wherein the impulse detector detects step impulses having a plurality of lengths and wherein the apparatus performs a process comprising:
storing the first filtered values as the pixel first values if the plurality of lengths have a first predetermined relationship with respect to the total number of pixels processed during the step impulse detection process; and
storing the second filtered pixel values as the pixel first values if the plurality of lengths have a second predetermined relationship with respect to the total number of pixels processed during the step impulse detecting process.

23. The apparatus of claim 1 wherein the impulse detector detects step impulses having a plurality of lengths, wherein the impulse reducer operates in a plurality of modes and wherein the apparatus performs a process comprising:
selecting a first one of the plurality of modes if the plurality of lengths have a first predetermined relationship with respect to the total number of pixels processed during the step impulse detecting process; and
selecting a second one of the plurality of modes if the plurality of lengths have a second predetermined relationship with respect to the total number of pixels processed during the step impulse detecting process.

24. The apparatus of claim 23 wherein the process further comprises selecting one of thy plurality of modes only if one of the corrected motion signals exceeds a motion threshold.

25. The apparatus of claim 23 wherein the impulse reducer comprises a median filter.

26. The apparatus of claim 25 wherein the plurality of modes of the filter comprise:
a horizontal filter mode;
a vertical filter mode; and
a horizontal and vertical filter mode.

27. The apparatus of claim 24 wherein the impulse reducer selects the pixel value that resides arithmetically in the middle of the distribution of pixel values presented to the impulse reducer.

28. The apparatus of claim 1 wherein the apparatus processes the pixels on a pixel-by-pixel basis.

29. The apparatus of claim 1 wherein the first values comprise a first frame of data and the second values comprise a second frame of data.

30. The apparatus of claim 29 wherein the differences between the first values and second values are derived from pixels in like positions of the first frame and second frame.

31. The apparatus of claim 1 wherein the pixel values comprise pixel luminance values.

32. A method of reducing random noise in video pixels having digital pixel values by processing the pixel values, said method comprising:
    storing filtered pixel first values corresponding to first pixels processed during a first time period;
    generating corrected motion signals in response to differences between the first values and pixel second values corresponding to second pixels processed during a second time period later than the first time period, the corrected motion signals representing detected motion of images represented by the first pixels relative to motion of images represented by the second pixels;
    generating first filtered values in response to the corrected motion signals and the differences between the first values and second values;
    performing a step impulse detecting process to generate control signals in response to detection of step impulses represented by the second pixels; and
    generating impulse-reduced pixel values in response to the first filtered values and the control signals.

33. The method of claim 32 wherein the second pixels correspond to lines comprising a horizontal first line and a horizontal second line, wherein a pixel being processed lies in the first line, wherein the images define edges and wherein the generating corrected motion signals comprises:
    generating initial motion signals representing an estimate of the detected motion of images in response to pixels in the first and second lines and responsive to the differences between the first values and the second values; and
    generating the corrected motion signals in response to the initial motion signals and characteristics of the images.

34. The method of claim 33, wherein generating the corrected motion signals comprises summing the initial motion signals for the second line to generate horizontal line motion signals and generating the corrected motion signals in response to the horizontal line motion signals.

35. The method of claim 33 wherein generating the corrected motion signals comprises modifying the initial motion signals in response to coefficients and wherein the method further comprises:
    generating low motion signals having values derived from the second pixels corresponding to motion of one or more of the images less than a predetermined first threshold;
    generating high motion signals having values derived from the second pixels corresponding to motion of one or more of the images greater than a predetermined second threshold; and
    varying the coefficients in response to at least one of the low motion signals and the high motion signals.

36. The method of claim 33 wherein the second pixels correspond to an area defining a horizontal direction and a vertical direction, wherein the images represent edges and wherein the characteristics of the images comprise:
    the proportion of the area representing one or more of the images with motion greater than a predetermined first threshold or less than a predetermined second threshold;
    the relation of the pixel being processed to one or more of the edges; and
    a change in the vertical direction of one or more of the images.

37. The method of claim 33 wherein the second pixels correspond to an area defining a horizontal direction and a vertical direction and wherein the generating the corrected motion signals comprises generating the corrected motion signals in response to the initial motion signals, in response to the second pixels corresponding to motion of one or more of the images beyond a threshold, in response to the relationship of the pixel being processed to one or more of the edges, in response to the relationship of the pixel being processed to a change of motion of one or more of the images in the vertical direction, and in response to the value of the pixel being processed.

38. The method of claim 33 wherein the generating initial motion signals comprises:
    generating horizontal filtered signals in response to the differences between the first values and the second values and in response to pixel values in the horizontal first line; and
    generating vertical filtered signals corresponding to the initial motion signals in response to the horizontal filtered signals and pixel values in the first and second lines.

39. The method of claim 38 wherein the generating the horizontal filtered signals comprises:
    generating absolute values corresponding to the differences between the first values and the second values;
    generating median filtered values in response to the absolute values; and
    finite impulse response filtering the median filtered values to generate the horizontal filtered signals.

40. The method of claim 39 wherein the second pixels correspond to an area defining a horizontal direction and a vertical direction and wherein the generating the corrected motion signals comprises:
    defining a programmable transfer function altered in response to one or more of the extent to which the second pixels correspond to motion of one or more of the images less than a predetermined first threshold and the extent to which the second pixels correspond to motion of one or more of the images greater than a predetermined second threshold, the transfer function generating first modified motion signals in response to the initial motion signals;
    generating edge signals indicating one or more of the edges in response to the horizontal filtered signals;
    arithmetically combining the edge signals with the first modified motion signals to generate second modified motion signals;
    modifying the second modified motion signals to generate third modified motion signals depending on the relationship of the pixel being processed to vertical change of motion of one or more of the images in the vertical direction; and
    generating the corrected motion signals in response to the third modified motion signals depending on the value of the pixel being processed.

41. The method of claim 40 wherein the generating edge signals comprises high pass filtering.

42. The method of claim 38 wherein the second pixels correspond to an area defining a horizontal direction and a vertical direction and wherein the generating the corrected motion signals comprises:
defining a programmable transfer function altered in response to one or more of the extent to which the second pixels correspond to motion of one or more of the images less than a predetermined first threshold and the extent to which the second pixels correspond to motion of one or more of the images greater than a predetermined second threshold, the transfer function generating first modified motion signals in response to the initial motion signals;
generating edge signals indicating one or more of the edges in response to the horizontal filtered signals;
arithmetically combining the edge signals with the first modified motion signals to generate second modified motion signals;
generating third modified motion signals depending on the relationship of the pixel being processed to vertical change of motion of one or more of the images in the vertical direction in response to the second modified motion signals; and
generating the corrected motion signals in response to the third modified motion signals depending on the value of the pixel being processed.

43. The method of claim 42 wherein the arithmetically combining comprises multiplying.

44. The method of claim 42 wherein the generating third modified motion signals is responsive to the sum the initial motion signals for the second line.

45. The method of claim 32 and further comprising at least estimating the average DC value of the second pixels and at least partially disabling the generating of the first filtered values in the event that the DC value exceeds a predetermined threshold.

46. The method of the claim 32 wherein the pixel first values comprise first luminance values and first chrominance values, wherein the pixel second values comprise second luminance values and second chrominance values, wherein the first filtered values comprise first filtered luminance values and first filtered chrominance values and wherein the method comprises:
generating first luminance arithmetic signals in response to first arithmetic relationships between the second luminance values and the first luminance values; and
generating first chrominance arithmetic signals in response to first arithmetic relationships between the second chrominance values and the first chrominance values, and wherein the generating first filtered values comprises:
generating adjusted chrominance motion signals in response to the corrected motion signals depending on the extent of correlation between the luminance values and chrominance values;
generating second luminance arithmetic signals in response to second arithmetic relationships between the corrected motion signals and the first luminance arithmetic signals;
generating second chrominance arithmetic signals in response to second arithmetic relationships between the adjusted chrominance motion signals and the first chrominance arithmetic signals;
generating the first filtered luminance values in response to third arithmetic relationships between the second luminance arithmetic signals and the second luminance values; and
generating the first filtered chrominance values in response to third arithmetic relationships between the second chrominance arithmetic signals and the pixel second values.

47. The method of claim 46 wherein the first arithmetic relationships comprise one of adding and subtracting relationships, wherein the second arithmetic relationships comprises one of multiplying and dividing relationships and wherein the third arithmetic relationships comprise one of adding and subtracting relationships.

48. The method or claim 32 wherein the step impulse detecting process comprises:
generating a first signal if the absolute difference between the pixel value being processed and an adjacent pixel value is less than a difference threshold value;
generating a second signal if the value of the pixel being processed is greater than a high level value or less than a low level value and the first signal is generated;
counting the number of consecutive pixels for which the second signal is generated; and
generating a third signal indicating a step impulse if the counting results in a number greater than a predetermined minimum number.

49. The method of claim 48 wherein one of the control signals is generated if a value of one of the corrected motion signals exceeds a motion threshold and the third signal is generated.

50. The method of claim 48 and further comprising:
storing the predetermined minimum number and a plurality of additional predetermined minimum numbers of different values;
performing the step impulse detecting process at least once for each of the predetermined minimum numbers;
counting the number of step impulses corresponding to each of the predetermined minimum numbers to generate a plurality of step impulse counts; and
determining the total number of pixels corresponding to each of the step impulse counts to generate a plurality of pixel counts.

51. The method of claim 50, and further comprising:
determining the total number of pixels processed during the step impulse detecting process;
determining the fraction of the total number of pixels represented by each of the plurality of pixel counts to generate a plurality of fractions;
storing a plurality of predetermined fraction values corresponding to the plurality of fractions;
storing the first filtered values as the pixel first values if the plurality of fractions has a first predetermined relationship with respect to the plurality of predetermined fraction values; and
storing the second filtered pixel values as the pixel first values if the plurality of fractions has a second predetermined relationship with respect to the plurality of predetermined fraction values.

52. The method of claim 50 wherein generating impulse-reduced pixel values operates in a plurality of different modes and wherein the method further comprises:
determining the maximum pixel count among the plurality of pixel counts;
determining the total number of pixels processed during the step impulse detecting process;

storing a plurality of predetermined fraction values corresponding to fractions of the total number of pixels processed; and selecting one of the plurality of different modes depending on the relationship between maximum pixel count and the plurality of predetermined fraction values.

53. The method of claim 32 wherein the step impulse detecting process detects step impulses having a plurality of lengths and wherein the method further comprises:

storing the first filtered values as the pixel first values if the plurality of lengths have a first predetermined relationship with respect to the total number of pixels processed during the step impulse detection process; and storing the second filtered pixel values as the pixel first values if the plurality of lengths have a second predetermined relationship with respect to the total number of pixels processed during the step impulse detecting process.

54. The method of claim 32 wherein the step impulse detecting process detects step impulses having a plurality of lengths, wherein the generating impulse-reduced pixel values operates in a plurality of operating modes and wherein the method further comprises:

selecting a first one of the plurality of operating modes if the plurality of lengths have a first predetermined relationship with respect to the total number of pixels processed during the step impulse detecting process; and selecting a second one of the plurality of operating modes if the plurality of lengths have a second predetermines relationship with respect to the total number of pixels processed during the step impulse detecting process.

55. The method of claim 54 wherein the process further comprises selecting one of the plurality of operating modes only if one of the corrected motion signals exceeds a motion threshold.

56. The method of claim 54 wherein the generating impulse-reduced values comprises median filtering.

57. The method of claim 56 wherein the plurality of operating modes comprises:

a horizontal filter mode;

a vertical filter mode; and a horizontal and vertical filter mode.

58. The method of claim 55 wherein the generating impulse-reduced pixel values comprises selecting the pixel value that resides arithmetically in the middle of the distribution of pixel values evaluated during generating impulse-reduced pixel values.

59. The method of claim 32 comprising processing the pixels on a pixel-by-pixel basis.

60. The method of claim 32 wherein the first values comprise a first frame of data and the second values comprise a second frame of data.

61. The method of claim 60 wherein the differences between the first values and second values are derived from pixels in like positions of the first frame and second frame.

62. The method of claim 32 wherein the pixel values comprise pixel luminance values.

* * * * *

UNITED STATES PATENT AND TRADEMARK OFFICE
CERTIFICATE OF CORRECTION

| | |
|---|---|
| PATENT NO. | : 7,050,501 B2 |
| APPLICATION NO. | : 10/196477 |
| DATED | : July 16, 2002 |
| INVENTOR(S) | : Jose Roberto Alvarez |

It is certified that error appears in the above-identified patent and that said Letters Patent is hereby corrected as shown below:

Column 24, line 62 delete "die" and insert --the--.
Column 25, line 27 delete "ranged" and insert --arranged--.
Column 27, line 44 delete "law" and insert --low--.
Column 28, line 8 delete "staring" and insert --storing--.
Column 28, line 25 delete "staring" and insert --storing--.
Column 28, line 57 delete "thy" and insert --the--.
Column 33, line 31 delete "predetermines" and insert --predetermined--.

Signed and Sealed this

Thirtieth Day of January, 2007

JON W. DUDAS
*Director of the United States Patent and Trademark Office*

UNITED STATES PATENT AND TRADEMARK OFFICE
CERTIFICATE OF CORRECTION

PATENT NO. : 7,050,501 B2
APPLICATION NO. : 10/196477
DATED : May 23, 2006
INVENTOR(S) : Jose Roberto Alvarez It is certified that error appears in the above-identified patent and that said Letters Patent is hereby corrected as shown below:

Column 24, line 62 delete "die" and insert --the--.
Column 25, line 27 delete "ranged" and insert --arranged--.
Column 27, line 44 delete "law" and insert --low--.
Column 28, line 8 delete "staring" and insert --storing--.
Column 28, line 25 delete "staring" and insert --storing--.
Column 28, line 57 delete "thy" and insert --the--.
Column 33, line 31 delete "predetermines" and insert --predetermined--.

This certificate supersedes Certificate of Correction issued January 30, 2007.

Signed and Sealed this

Sixth Day of March, 2007

JON W. DUDAS
*Director of the United States Patent and Trademark Office*